United States Patent
Yamamoto et al.

(10) Patent No.: US 10,519,966 B2
(45) Date of Patent: Dec. 31, 2019

(54) PLAIN BEARING AND PUMP

(71) Applicant: EAGLE INDUSTRY CO., LTD., Tokyo (JP)

(72) Inventors: Shinya Yamamoto, Tokyo (JP); Satoshi Yasu, Tokyo (JP); Takeshi Hosoe, Tokyo (JP); Yuichiro Tokunaga, Tokyo (JP); Keiichi Chiba, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 163 days.

(21) Appl. No.: 15/538,577

(22) PCT Filed: Dec. 22, 2015

(86) PCT No.: PCT/JP2015/085884
§ 371 (c)(1),
(2) Date: Jun. 21, 2017

(87) PCT Pub. No.: WO2016/104535
PCT Pub. Date: Jun. 30, 2016

(65) Prior Publication Data
US 2017/0350407 A1    Dec. 7, 2017

(30) Foreign Application Priority Data
Dec. 22, 2014   (JP) ................. 2014-259066

(51) Int. Cl.
*F04D 29/046* (2006.01)
*F04D 29/06* (2006.01)
(Continued)

(52) U.S. Cl.
CPC ............ *F04D 29/046* (2013.01); *F04D 1/00* (2013.01); *F04D 13/0633* (2013.01);
(Continued)

(58) Field of Classification Search
CPC ...... F16C 17/045; F16C 17/10; F16C 17/107; F16C 32/0633; F16C 32/0644;
(Continued)

(56) References Cited

U.S. PATENT DOCUMENTS 3,999,897 A * 12/1976 Strub .................. F04D 25/06
                                                   417/423.13
5,449,235 A    9/1995 Buckmann
(Continued)

FOREIGN PATENT DOCUMENTS

CN         87102163 A      10/1987
CN         1619170 A        5/2005
(Continued)

OTHER PUBLICATIONS

Chinese Office Action dated Jul. 4, 2018 with English translation (corresponding to CN 201580068918.2).
(Continued)

*Primary Examiner* — Marcus Charles
(74) *Attorney, Agent, or Firm* — Harness, Dickey & Pierce, P.L.C.

(57) ABSTRACT

A plain bearing (410) is fixed to a shaft hole (401) of an impeller (400) of the pump (100) so as to rotatably support the impeller (400) with respect to the shaft (300), and is restricted from moving in an axial direction by an annular restrictor (310) fixed to the shaft (300). On an end face (411) of the plain bearing (410) facing the restrictor (310), a lubrication groove (412) connecting a radially inner side and a radially outer side of the end face (411) to supply cooling water onto the end face (411) for lubrication, and a dynamic pressure generating groove (413) that introduces a flow of cooling water created by rotation of the impeller (400) to generate a dynamic pressure, are provided. The present bearing suppresses an increase in rotation torque of the impeller (400) during high speed rotation.

12 Claims, 18 Drawing Sheets

(51) Int. Cl.
| | | |
|---|---|---|
| *F04D 1/00* | (2006.01) | |
| *F04D 29/22* | (2006.01) | |
| *F04D 29/42* | (2006.01) | |
| *F16C 33/10* | (2006.01) | |
| *F16C 32/06* | (2006.01) | |
| *F16C 17/04* | (2006.01) | |
| *F04D 29/041* | (2006.01) | |
| *F04D 13/06* | (2006.01) | |
| *F04D 29/047* | (2006.01) | |

(52) U.S. Cl.
CPC ....... *F04D 29/0413* (2013.01); *F04D 29/061* (2013.01); *F04D 29/22* (2013.01); *F04D 29/426* (2013.01); *F16C 17/045* (2013.01); *F16C 32/06* (2013.01); *F16C 33/107* (2013.01); *F16C 33/1045* (2013.01); *F04D 29/047* (2013.01); *F05D 2240/53* (2013.01); *F16C 2360/44* (2013.01)

(58) Field of Classification Search
CPC .. F16C 33/1045; F16C 33/107; F16C 37/007; F16C 2360/44; F16C 2361/23; F16C 32/06; F01D 25/166; F01D 25/186; F04D 1/00; F04D 13/02; F04D 13/0633; F04D 29/061; F04D 29/046; F04D 29/047; F04D 29/0473; F04D 29/22; F04D 29/426; F04D 29/0413; F04B 5/00; F05D 2240/53
USPC ....... 384/100, 107, 112, 121, 129, 226, 243, 384/322, 606; 415/132, 170.1, 229; 417/365, 423.12, 423, 13, 423.14
See application file for complete search history.

(56) References Cited

U.S. PATENT DOCUMENTS

| | | | | |
|---|---|---|---|---|
| 7,422,370 B2* | 9/2008 | LeBlanc | ............... | F16C 17/026 384/107 |
| 9,593,589 B2* | 3/2017 | Trivedi | ................... | F01D 11/22 |
| 2002/0122608 A1* | 9/2002 | Fujikawa | ............ | F16C 32/0696 384/100 |
| 2003/0215323 A1* | 11/2003 | Prinz | ....................... | F01D 5/048 415/14 |
| 2005/0095149 A1 | 5/2005 | Tanaka et al. | | |
| 2006/0088234 A1 | 4/2006 | Nii et al. | | |
| 2010/0148606 A1* | 6/2010 | Yu | .......................... | F16C 17/107 310/90 |
| 2013/0004348 A1* | 1/2013 | Sugiyama | ............. | F16C 33/745 417/423.7 |
| 2013/0121859 A1* | 5/2013 | Hirono | .................. | F04D 25/062 417/423.13 |
| 2014/0286600 A1* | 9/2014 | Yamada | ................ | F16C 33/745 384/107 |
| 2015/0115537 A1* | 4/2015 | Tokunaga | .............. | F16J 15/348 277/348 |
| 2015/0377360 A1 | 12/2015 | Itadani et al. | | |

FOREIGN PATENT DOCUMENTS

| | | | | |
|---|---|---|---|---|
| CN | 1763388 A | 4/2006 | | |
| CN | 103097782 A | 5/2013 | | |
| CN | 203685657 U | 7/2014 | | |
| DE | 3834862 A1 * | 4/1990 | .......... | F04D 29/047 |
| DE | 102008020872 A1 | 10/2009 | | |
| DE | 102013208460 A1 * | 11/2014 | ......... | F04D 13/0633 |
| EP | 0240674 A2 | 10/1987 | | |
| EP | 1114947 A1 | 7/2001 | | |
| JP | S63-106427 A | 5/1988 | | |
| JP | H05-322050 A | 12/1993 | | |
| JP | 2004-072967 A | 3/2004 | | |
| JP | 2005-139917 A | 6/2005 | | |
| JP | 2005-207333 A | 8/2005 | | |
| JP | 2007-64278 A | 3/2007 | | |
| JP | 2012-241774 A | 12/2012 | | |
| JP | 2013061063 A * | 4/2013 | ............ | F16C 33/745 |
| JP | 2014-236644 A | 12/2014 | | |
| WO | 2014/148317 A1 | 9/2014 | | |
| WO | 2015/146740 A1 | 10/2015 | | |
| WO | WO-2016107618 A1 * | 7/2016 | ............. | F04D 13/02 |

OTHER PUBLICATIONS

Extended European Search Report dated Jul. 23, 2018 (corresponding to EP 15873103.4).

\* cited by examiner

PLAIN BEARING AND PUMP

CROSS-REFERENCE TO RELATED APPLICATIONS

This application is a National Stage of International Application No. PCT/JP2015/085884, filed Dec. 22, 2015, (now WO 2016/104535A1), which claims priority to Japanese Application No. 2014-259066, filed Dec. 22, 2014. The entire disclosures of each of the above applications are incorporated herein by reference.

FIELD

The present disclosure relates to a plain bearing and a pump.

BACKGROUND

Pumps for transferring a fluid by pressure by an impeller that rotates with respect to a shaft provided inside a housing have hitherto been known (see PTL 1 and PTL 2). Some of the pumps thus configured may use an annular plain bearing for rotatably supporting the impeller with respect to the shaft. When the plain bearing is fixed to the impeller, the plain bearing can move along an axial direction (thrust direction) with respect to the shaft. Therefore, an annular restrictor (such as a washer) fixed to the shaft is sometimes used to restrict the axial movement of the plain bearing.

When the rotation speed of the impeller is high, however, the impeller may move toward the restrictor. This can increase the sliding resistance of the plain bearing against the restrictor (sliding resistance between the opposing surfaces of the plain bearing and the restrictor), which may increase the rotation torque of the impeller and lower the pump performance.

CITATION LIST

Patent Literature

[PTL 1] Japanese Patent Application Laid-open No. 2005-139917
[PTL 2] Japanese Patent Application Laid-open No. 2004-72967

SUMMARY

Technical Problem

An object of the present disclosure is to provide a plain bearing and a pump that can minimize an increase in rotation torque of the impeller during high speed rotation.

Solution to Problem

The present disclosure adopted the following configurations to solve the problem noted above.

Namely, the plain bearing according to the present disclosure is an annular plain bearing provided to a pump including a housing, a shaft provided in the housing, and an impeller rotating with respect to the housing to transfer a fluid by pressure in the housing, the plain bearing rotatably supporting the impeller with respect to the housing and being restricted from moving in an axial direction by an annular restrictor fixed to the housing, wherein on an end face of the plain bearing facing the restrictor, a lubrication groove communicating with a radially inner side and a radially outer side of the end face to supply the fluid onto the end face for lubrication, and a dynamic pressure generating groove that introduces a fluid flow created by rotation of the impeller to generate a dynamic pressure, are provided.

With the plain bearing according to the present disclosure, the lubrication groove provides lubrication on the end face of the plain bearing, so that the sliding resistance of the plain bearing against the restrictor is reduced. The dynamic pressure generated by the dynamic pressure generating groove acts on the end face of the plain bearing in a direction away from the restrictor, so that the sliding resistance of the plain bearing against the restrictor is further reduced. Thus, with the plain bearing according to the present disclosure, an increase in rotation torque of the impeller can be minimized even when the impeller rotates at high speed.

The shaft may be fixed to the housing, with the restrictor being fixed to the housing via the shaft, and the impeller may have a shaft hole for the shaft to pass through and rotate with respect to the shaft, with the plain bearing being fixed in the shaft hole of the impeller and rotatably supporting the impeller with respect to the shaft, so as to rotatably support the impeller with respect to the housing.

Or, the shaft may rotate with respect to the housing, while the impeller may be fixed to the shaft and rotate with the shaft with respect to the housing, with the plain bearing rotatably supporting the shaft, so as to rotatably support the impeller with respect to the housing.

The lubrication groove may be formed deeper than the dynamic pressure generating groove. This allows both grooves to effectively exhibit their functions.

The lubrication groove and dynamic pressure generating groove may be formed in the following manner: The lubrication groove may be formed linearly in a radial direction, and the dynamic pressure generating groove may be formed to extend circumferentially from the lubrication groove. The lubrication groove and dynamic pressure generating groove may each have a spirally extending shape and be alternately arranged and spaced apart from each other circumferentially. The lubrication groove and dynamic pressure generating groove may each be formed in a V shape with an apex thereof being oriented in a same circumferential direction, each communicate with the radially inner side and the radially outer side of the end face, and be formed adjacent to each other in the circumferential direction. In this case, the lubrication groove and dynamic pressure generating groove may be arranged in this order adjacent to each other in the circumferential direction in which the apex of the V shape is oriented. Alternatively, the lubrication groove, dynamic pressure generating groove, and a portion of the end face where no grooves are formed may be arranged in this order adjacent to each other in the circumferential direction in which the apex of the V shape is oriented.

The pump according to the present disclosure is a pump for transferring a fluid by pressure, comprising: a housing; a shaft provided in the housing; an impeller that rotates with respect to the housing to transfer a fluid by pressure inside the housing; an annular plain bearing that rotatably supports the impeller with respect to the housing; and an annular restrictor that is fixed to the housing and restricts movement of the plain bearing in an axial direction, wherein either on one of an end face of the plain bearing facing the restrictor and an end face of the restrictor facing the plain bearing, a lubrication groove communicating with a radially inner side and a radially outer side of the end face to supply the fluid onto the end face for lubrication, and a dynamic pressure generating groove that introduces a fluid flow created by rotation of the impeller to generate a dynamic pressure, are provided.

With the pump according to the present disclosure, the sliding resistance of the plain bearing against the restrictor is reduced, in whichever end face the lubrication groove is provided. In whichever end face the dynamic pressure generating groove is provided, the generated dynamic pressure acts on the end face of the plain bearing in a direction away from the restrictor, so that the sliding resistance of the plain bearing against the restrictor is further reduced. Thus, with the plain bearing according to the present disclosure, an increase in rotation torque of the impeller can be minimized even when the impeller rotates at high speed.

The shaft may be fixed to the housing, with the restrictor being fixed to the housing via the shaft, and the impeller may have a shaft hole for the shaft to pass through and rotate with respect to the shaft, with the plain bearing being fixed in the shaft hole of the impeller and rotatably supporting the impeller with respect to the shaft, so as to rotatably support the impeller with respect to the housing.

Or, the shaft may rotate with respect to the housing, and the impeller may be fixed to the shaft and rotate with the shaft with respect to the housing, with the plain bearing rotatably supporting the shaft, so as to rotatably support the impeller with respect to the housing.

The lubrication groove may be formed deeper than the dynamic pressure generating groove. This allows both grooves to effectively exhibit their functions.

The lubrication groove and dynamic pressure generating groove in the pump may adopt a configuration similar to that of the plain bearing according to the present disclosure described above.

Advantageous Effects of the Disclosure

The present disclosure can provide a plain bearing and a pump that can minimize an increase in rotation torque of the impeller during high speed rotation.

DRAWINGS

DETAILED DESCRIPTION

Modes for carrying out this disclosure will be hereinafter illustratively described in detail based on specific embodiments with reference to the drawings. It should be noted that, unless otherwise particularly specified, the sizes, materials, shapes, and with respect arrangement or the like of constituent components described in the embodiments are not intended to limit the scope of this disclosure.

Embodiment 1

The plain bearing and pump according to Embodiment 1 of the present disclosure will be described with reference to the drawings. In this embodiment, an electric water pump used for pumping cooling water in a hybrid car or the like will be described as one example. Therefore, in this embodiment, the fluid transferred by pressure by the pump is cooling water.

<Overall Configuration of Pump>

Figure 1:
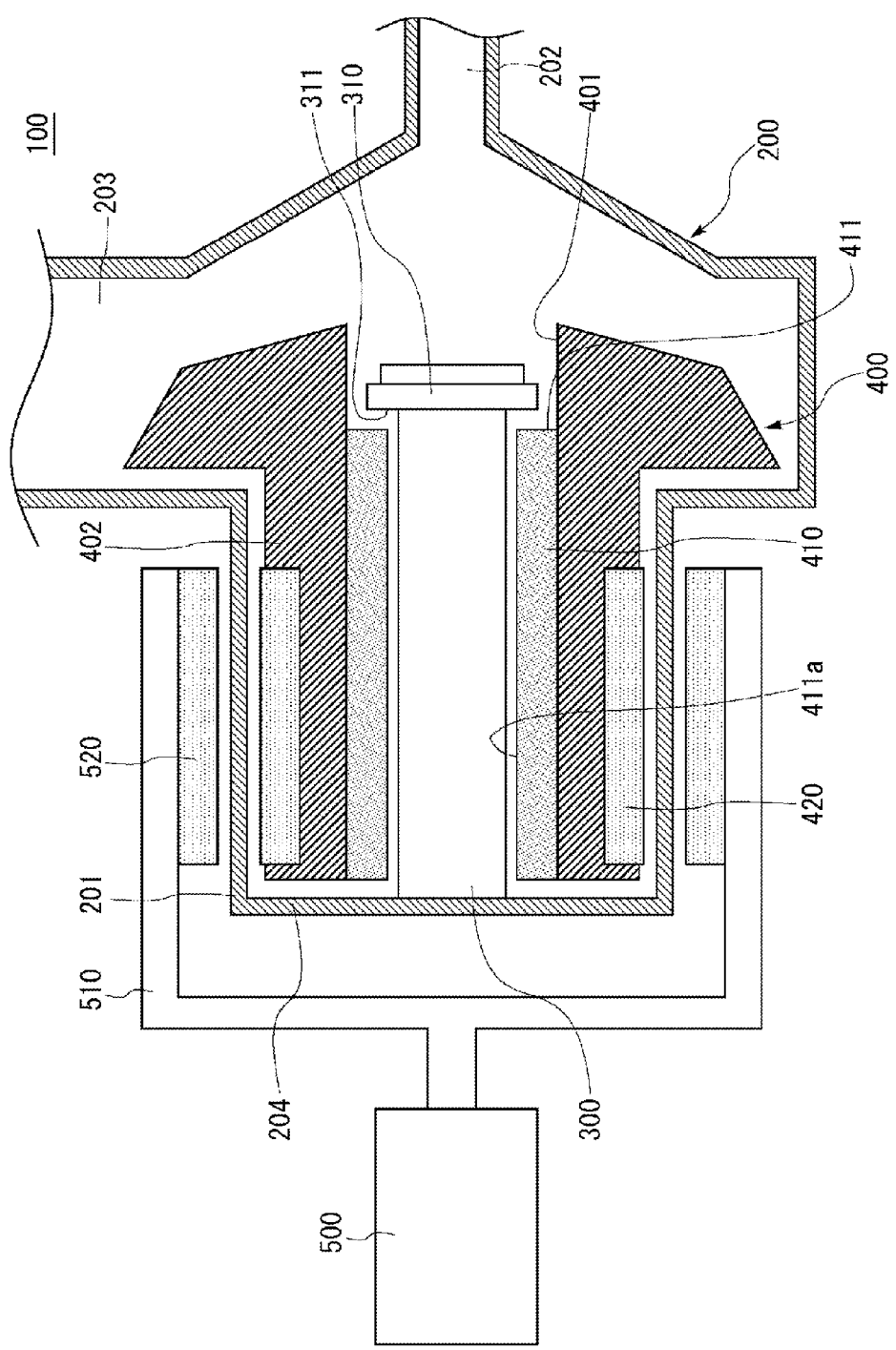
FIG. 1 is a schematic cross-sectional view of a pump according to an embodiment.

The overall configuration of the pump according to the embodiment of the present disclosure will be described with reference to FIG. 1. FIG. 1 is a schematic cross-sectional view of the pump 100 according to the embodiment of the present disclosure. It is a schematic cross-sectional view of a plane that contains the center axis of a shaft 300. For convenience of explanation, depth is not shown. The drawing basically shows only an end face.

The pump 100 includes a housing 200, the shaft 300 provided inside the housing 200, and an impeller 400 that rotates with respect to the shaft 300 to transfer a fluid by pressure inside the housing 200. The shaft 300 is fixed to the housing 200. The impeller 400 has a shaft hole 401 for the shaft 300 to pass through, and an annular (cylindrical) plain bearing 410 is fixed to the shaft hole 401. In this embodiment, the impeller 400 is made of resin, while the plain bearing 410 is made of carbon. Inner magnets 420 for driving the impeller 400 to rotate are provided on the outer circumference of an axially extending body part 402 of the impeller 400. The impeller 400 is formed by insert molding, with the plain bearing 410 and inner magnets 420 as inserts, to be integral with them. Alternatively, the impeller 400 may be formed by insert molding with the inner magnets 420 as inserts, and then the plain bearing 410 may be press-fitted to the impeller 400.

When the impeller 400 is mounted to the shaft 300, i.e., when the shaft 300 is passed through the plain bearing 410, there is formed a very small annular gap between the outer circumferential surface of the shaft 300 and the inner circumferential surface of the plain bearing 410. Therefore, the plain bearing 410 can move on the outer circumferential surface of the shaft 300 in an axial direction (thrust direction). Therefore, the shaft 300 is provided with an annular restrictor 310 that restricts the axial movement of the plain bearing 410 and is fixed to the shaft 300. In this embodiment, the restrictor 310 is made of a corrosion resistant metal. Between an end face 411 of the plain bearing 410 facing the restrictor 310 (end face on the right side in FIG. 1) and an end face 311 of the restrictor 310 facing the plain bearing 410 (end face on the left side in FIG. 1) remains a very small gap. This way, the impeller 400 is mounted to the shaft 300 such that it is allowed to move in the axial direction to some extent. There remains a very small gap also between the outer circumferential surface of the body part 402 of the impeller 400 and the inner circumferential surface of a cylindrical part 201 of the housing 200. The restrictor 310 is fixed to the shaft 300 by a fit between a hole and the shaft. Instead, the shaft 300 may be provided with threads to fix the restrictor by threaded engagement.

A bracket 510 that is rotated by a motor 500 is provided outside the housing 200 such as to surround the cylindrical part 201 of the housing 200. Outer magnets 520 are provided in the bracket 510 at positions opposite the inner magnets 420 of the impeller 400. The inner magnets 420 and outer magnets 520 are positioned such as to attract each other. When the motor 500 is driven by power supplied from an external source and the bracket 510 rotates, the inner magnets 420 are drawn by the rotating outer magnets 520 and rotate, so that the impeller 400 rotates with respect to the shaft 300. Thereby, the cooling water flowing into the housing 200 from an inlet passage 202 is pumped out from an outlet passage 203. The pressure for pumping the cooling water is controlled by the rotational speed of the motor 500.

<End Face of Plain Bearing>

Figure 2:
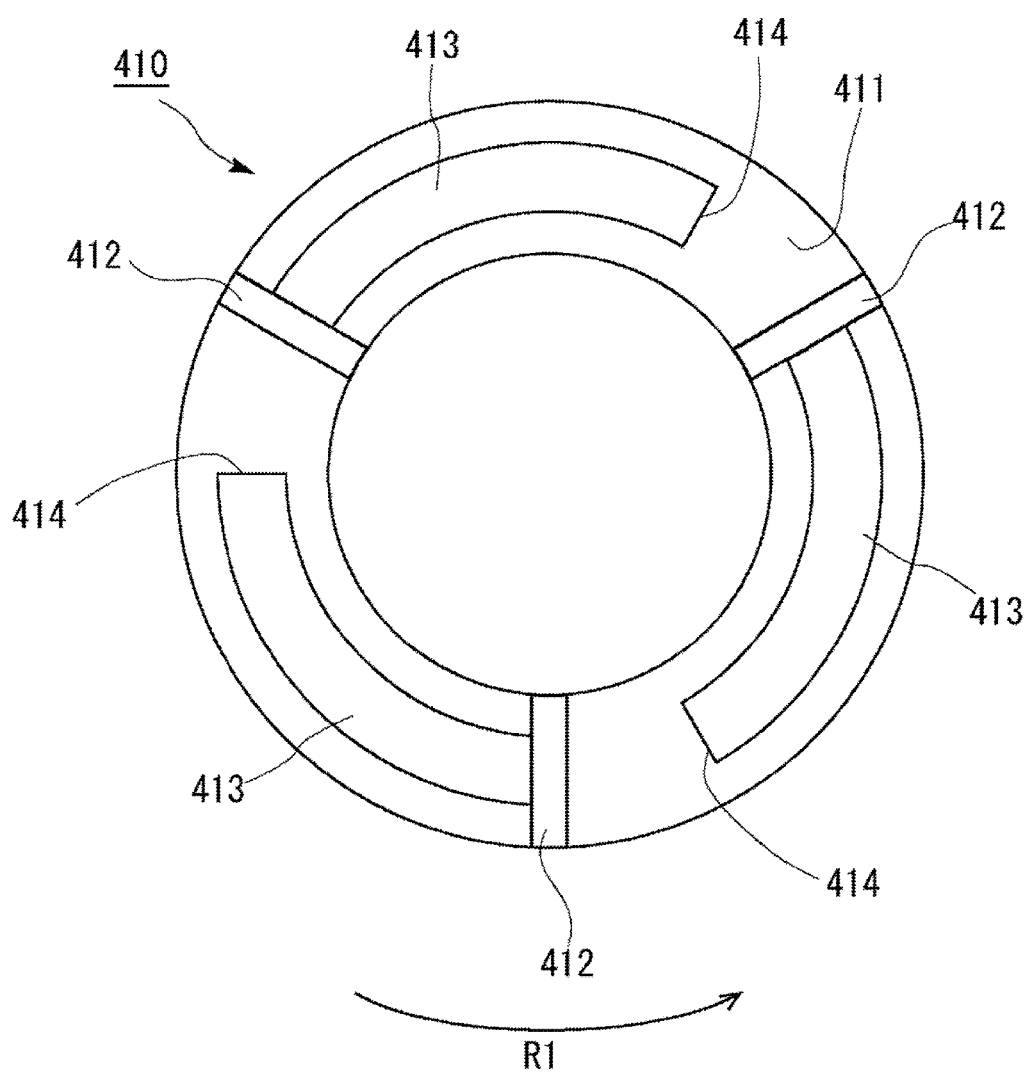
FIG. 2 is a diagram of a plain bearing according to Embodiment 1 as viewed from an axial direction.

Next, the end face 411 of the plain bearing 410 facing the restrictor 310 will be described in detail with reference to FIG. 2. FIG. 2 is a diagram of the plain bearing 410 as viewed from the restrictor 310 side in an axial direction and illustrates the configuration of the end face 411.

As shown in FIG. 2, in the end face 411 are formed lubrication grooves 412 communicating with a radially inner side and a radially outer side of the end face to supply cooling water onto the end face 411 for lubrication, and dynamic pressure generating grooves 413 that introduce a flow of cooling water created by the rotation of the impeller 400 to generate a dynamic pressure. Three lubrication grooves 412 and dynamic pressure generating grooves 413 each are provided and circumferentially spaced apart from each other. One lubrication groove 412 and one dynamic pressure generating groove 413 are formed as a single groove in a shape also known as Rayleigh step. The portions where no grooves are formed on the end face 411 have a surface that underwent polishing to reduce sliding resistance.

Figure 10:
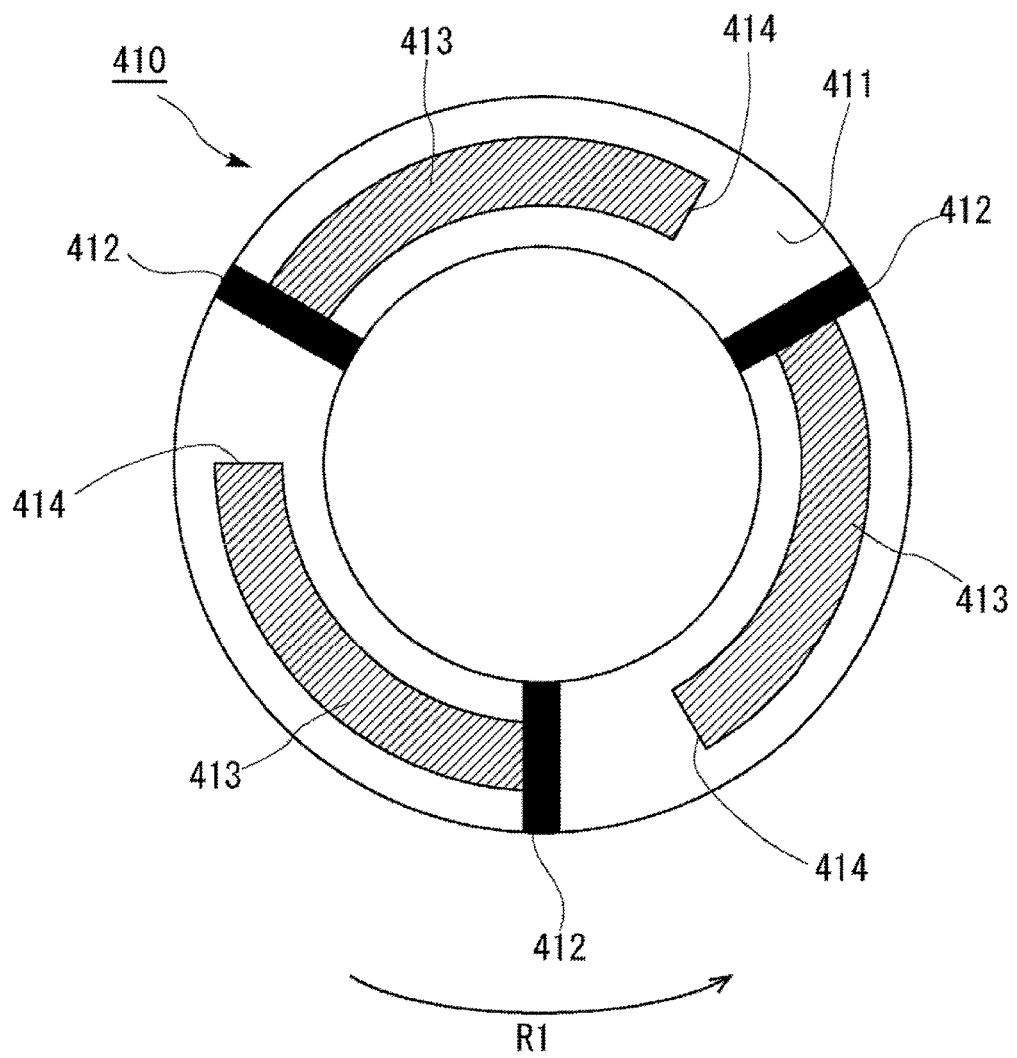
FIG. 10 is a diagram showing the depths of the grooves in the plain bearing according to Embodiment 1.

The lubrication grooves 412 are formed such as to extend straight radially all the way through and have a generally constant width (circumferential width). The dynamic pressure generating grooves 413 extend circumferentially from the center (radial center) of the lubrication grooves 412 and have a generally constant width (radial width) that is larger than the width of the lubrication grooves 412. The direction to which the dynamic pressure generating grooves 413 extend (from the lubrication groove 412 to the distal ends 414) is opposite from the rotating direction of the impeller 400, i.e., the rotating direction of the plain bearing 410. Namely, as shown in FIG. 2, when the rotating direction of the plain bearing 410 is counterclockwise as indicated with arrow R1 in the drawing, the cooling water flows also counterclockwise inside the housing 200, but the flow of cooling water with respect to the plain bearing 410 (with respect flow) is clockwise. Therefore, the dynamic pressure generating grooves 413 are formed to extend clockwise from the lubrication grooves 412 so that their open ends (lubrication groove 412 side) face against the flow. This way, the dynamic pressure generating grooves 413 are formed such as to readily introduce the cooling water. The lubrication grooves 412 and dynamic pressure generating grooves 413 each have a depth in the order of microns, the lubrication grooves 412 being deeper than the dynamic pressure generating grooves 413. That is, as shown in FIG. 10, the lubrication grooves 412 shown in black are formed deeper than the dynamic pressure generating grooves 413 indicated with hatched lines. Both grooves have a generally constant depth, but they may be formed with a varying depth. The dynamic pressure generating grooves 413 in particular may be formed to become shallower toward the distal ends 414 of the dynamic pressure generating grooves 413.

<Mechanism During Pump Operation>

During the operation of the pump 100, as mentioned above, there is created a flow of cooling water from the inlet passage 202 to the outlet passage 203 of the housing 200 by the rotation of the impeller 400. Part of the cooling water flows also into the shaft hole 401 of the impeller 400. In the end face 411 of the plain bearing 410 that is fixed to the shaft hole 401 are formed the lubrication grooves 412 communicating with the radially inner side and outer side of the end face 411. Therefore, the cooling water that has entered the shaft hole 401 travels through the lubrication grooves 412 from the radially outer side to the inner side and flows into the annular gap between the plain bearing 410 and the shaft 300. Since the plain bearing 410 is rotating with the impeller 400, the cooling water is fed onto the end face 411 from the rotating lubrication grooves 412. The cooling water thus supplied forms a lubrication layer of cooling water all around on the end face 411 so that the sliding resistance of the plain bearing 410 against the restrictor 310 is reduced. This way, even though there is only a very small gap between the end face 411 of the plain bearing 410 and the end face 311 of the restrictor 310, the cooling water fed from the lubrication grooves 412 provides consistent lubrication between both end faces.

In the end face 411 are also formed the dynamic pressure generating grooves 413 that introduce the flow of cooling water created by the rotation of the impeller 400 to generate a dynamic pressure. Thus, during the rotation of the impeller 400, a dynamic pressure is generated by the cooling water that flows through the lubrication grooves 412 into the dynamic pressure generating grooves 413. This dynamic pressure acts on the end face 411 of the plain bearing 410 in a direction away from the restrictor 310, so that the sliding resistance of the plain bearing 410 against the restrictor 310 is further reduced.

<Advantages of the Pump According to this Embodiment>

In the pump 100 according to this embodiment, the lubrication grooves 412 formed in the end face 411 of the plain bearing 410 provide lubrication on the end face 411, and the dynamic pressure generating grooves 413 formed in the end face 411 generate a dynamic pressure that acts on the end face 411 in a direction away from the restrictor 310. This way, the sliding resistance of the plain bearing 410 against the restrictor 310 is synergistically reduced. Therefore, even when the impeller 400 moves toward the restrictor 310 because of the flow of cooling water or the influence of the centrifugal force during high speed rotation of the impeller 400, the sliding resistance of the plain bearing 410 against the restrictor 310 can be reduced. As a result, an increase in rotation torque of the impeller 400 can be minimized, so that a reduction in pump 100 performance can be prevented. In particular, since the lubrication grooves 412 are formed deeper than the dynamic pressure generating grooves 413, a necessary amount of fluid for the lubrication grooves 412, which is relatively larger, can be secured. Thus, both grooves can effectively exhibit their functions.

In the pump 100 according to this embodiment, the lubrication grooves 412 communicate with both sides of the end face 411, so that the cooling water can flow in from both sides in the radial direction of the end face 411. Even when the impeller 400 moves toward the restrictor 310 and the end face 411 contacts the end face 311 of the restrictor 310, the cooling water can flow into the lubrication grooves 412. Therefore, even in such a situation, the lubrication grooves 412 and dynamic pressure generating grooves 413 can exhibit their functions. Moreover, in the pump 100 according to this embodiment, the pressure of the cooling water flowing into the lubrication grooves 412 and dynamic pressure generating grooves 413 is higher during high speed rotation of the impeller 400, so that the lubrication grooves 412 and dynamic pressure generating grooves 413 can exhibit their functions more easily. Namely, this embodiment provides the advantage that the sliding resistance of the plain bearing 410 can be reduced even more during high speed rotation when the impeller 400 tends to move toward the restrictor 310.

Another advantage is that the plain bearing 410 according to this embodiment is made of carbon so that it is lightweight as compared to other materials, wear resistant, and has a self-lubricating effect.

As described above, according to this embodiment, the shaft 300 is fixed to the housing 200. The restrictor 310 is fixed to the housing 200 via the shaft 300. The impeller 400 has a shaft hole 401 for the shaft 300 to pass through and rotates with respect to the shaft 300. The plain bearing 410 is fixed to the shaft hole 401 of the impeller 400 to rotatably support the impeller 400 with respect to the shaft 300, so that the impeller 400 is rotatably supported with respect to the housing 200.

Embodiment 2

Next, Embodiment 2 of the present disclosure will be described with reference to FIG. 3. This embodiment is different from Embodiment 1 described above only in the shapes of the lubrication grooves and dynamic pressure generating grooves provided in the end face 411 of the plain bearing 410, and other configurations are the same. Therefore, the difference only will be described below, and other configurations and effects will not be described again. The same constituent elements are given the same reference numerals.

Figure 3:
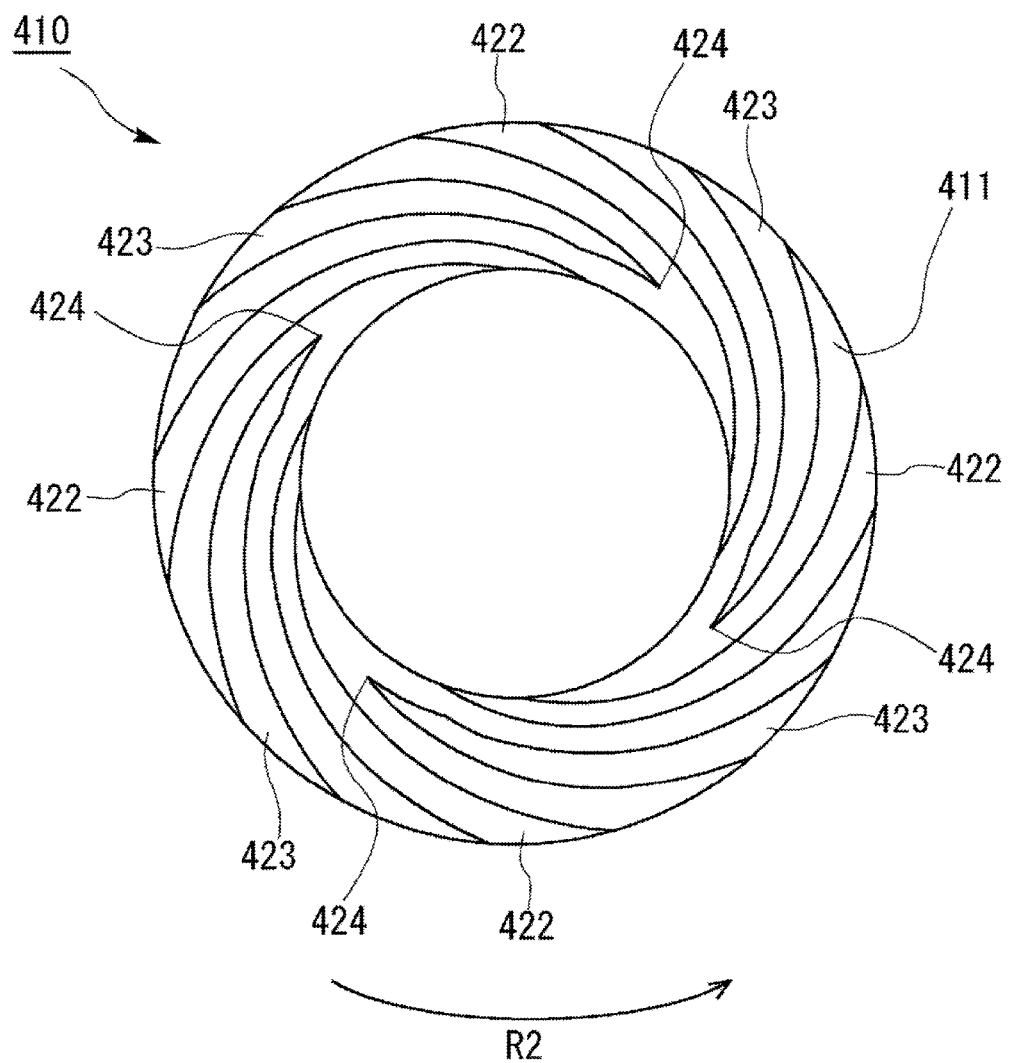
FIG. 3 is a diagram of a plain bearing according to Embodiment 2 as viewed from an axial direction.

FIG. 3, similarly to FIG. 2 described above, is a diagram of the plain bearing 410 as viewed from the restrictor 310 side in an axial direction and illustrates the configuration of the end face 411. In the end face 411 are formed lubrication grooves 422 communicating with the radially inner side and outer side of the end face to supply cooling water onto the end face 411 for lubrication, and dynamic pressure generating grooves 423 that introduce a flow of cooling water created by the rotation of the impeller 400 to generate a dynamic pressure. The lubrication grooves 422 and dynamic pressure generating grooves 423 each have a spirally extending shape and are alternately arranged and spaced apart from each other circumferentially. Four lubrication grooves 422 and dynamic pressure generating grooves 423 each are provided.

Figure 11:
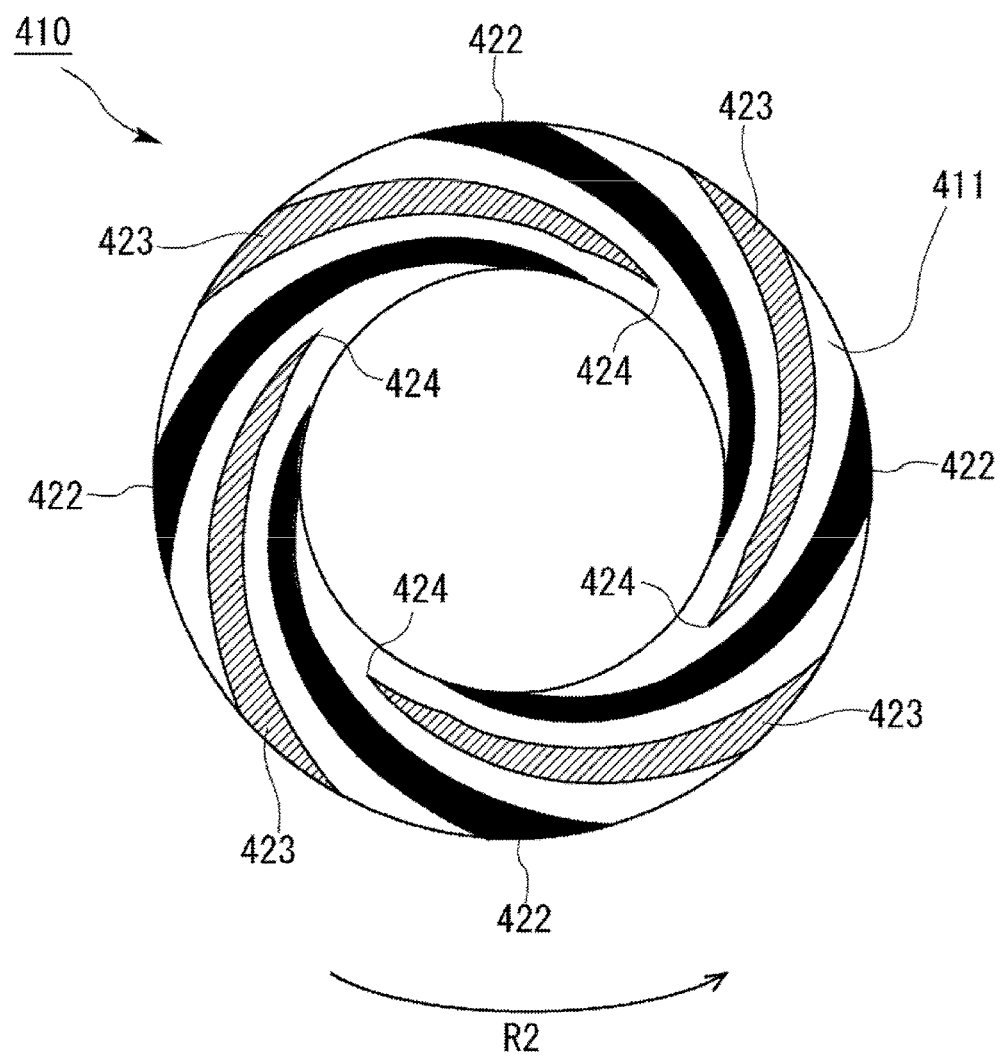
FIG. 11 is a diagram showing the depths of the grooves in the plain bearing according to Embodiment 2.

The lubrication grooves 422 are gradually reduced in width (circumferential width) from the radially outer side toward the inner side. The dynamic pressure generating grooves 423 communicate only with the radially outer side of the end face 411 and are gradually reduced in width (circumferential width) toward the distal ends 424. The direction to which the lubrication grooves 422 and dynamic pressure generating grooves 423 extend from the radially outer side of the end face 411 is opposite from the rotating direction of the impeller 400, i.e., the rotating direction of the plain bearing 410. Namely, as shown in FIG. 3, when the plain bearing 410 rotates counterclockwise as indicated with arrow R2 in the drawing, the lubrication grooves 422 and dynamic pressure generating grooves 423 are formed to extend clockwise from the radially outer side of the end face 411. In particular, the dynamic pressure generating grooves 423 have their open ends facing against the with respect flow of cooling water. The lubrication grooves 422 and dynamic pressure generating grooves 423 each have a depth similar to that of Embodiment 1 described above. That is, as shown in FIG. 11, the lubrication grooves 422 shown in black are formed deeper than the dynamic pressure generating grooves 423 indicated with hatched lines.

The lubrication grooves 422 and dynamic pressure generating grooves 423 exhibit functions similar to those of the lubrication grooves 412 and dynamic pressure generating grooves 413 of Embodiment 1 described above. Namely, during the rotation of the impeller 400, the cooling water passes through the lubrication grooves 422 from the radially outer side to the inner side. As the cooling water is fed onto and lubricates the end face 411, the sliding resistance of the plain bearing 410 against the restrictor 310 is reduced. During the rotation of the impeller 400, the cooling water flowing into the dynamic pressure generating grooves 423 from the radially outer side generates a dynamic pressure, and this further reduces the sliding resistance of the plain bearing 410 against the restrictor 310. As a result, similarly to Embodiment 1 described above, even when the impeller 400 moves toward the restrictor 310, an increase in rotation torque of the impeller 400 can be minimized.

<Others>

The configuration of the plain bearing 410 according to the present disclosure is not limited to those of the embodiments described above. For example, the shapes and numbers of the lubrication grooves and dynamic pressure generating grooves formed in the end face 411 can be changed as required as long as the sliding resistance of the plain bearing 410 against the restrictor 310 is reduced. For the material of the plain bearing 410, a less expensive resin such as polyphenylene sulphide (PPS) may be used instead of the carbon mentioned above.

Figure 4:
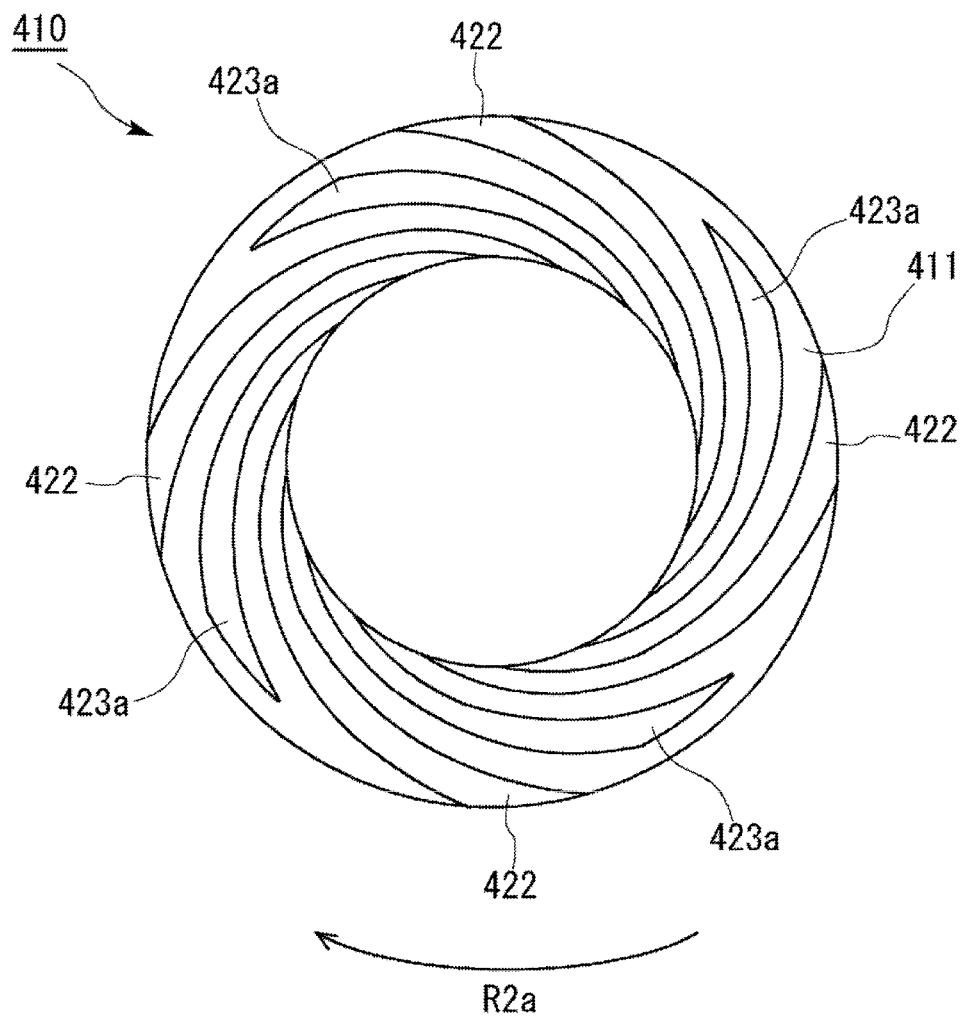
FIG. 4 is a diagram showing another shape of dynamic pressure generating grooves.
Figure 12:
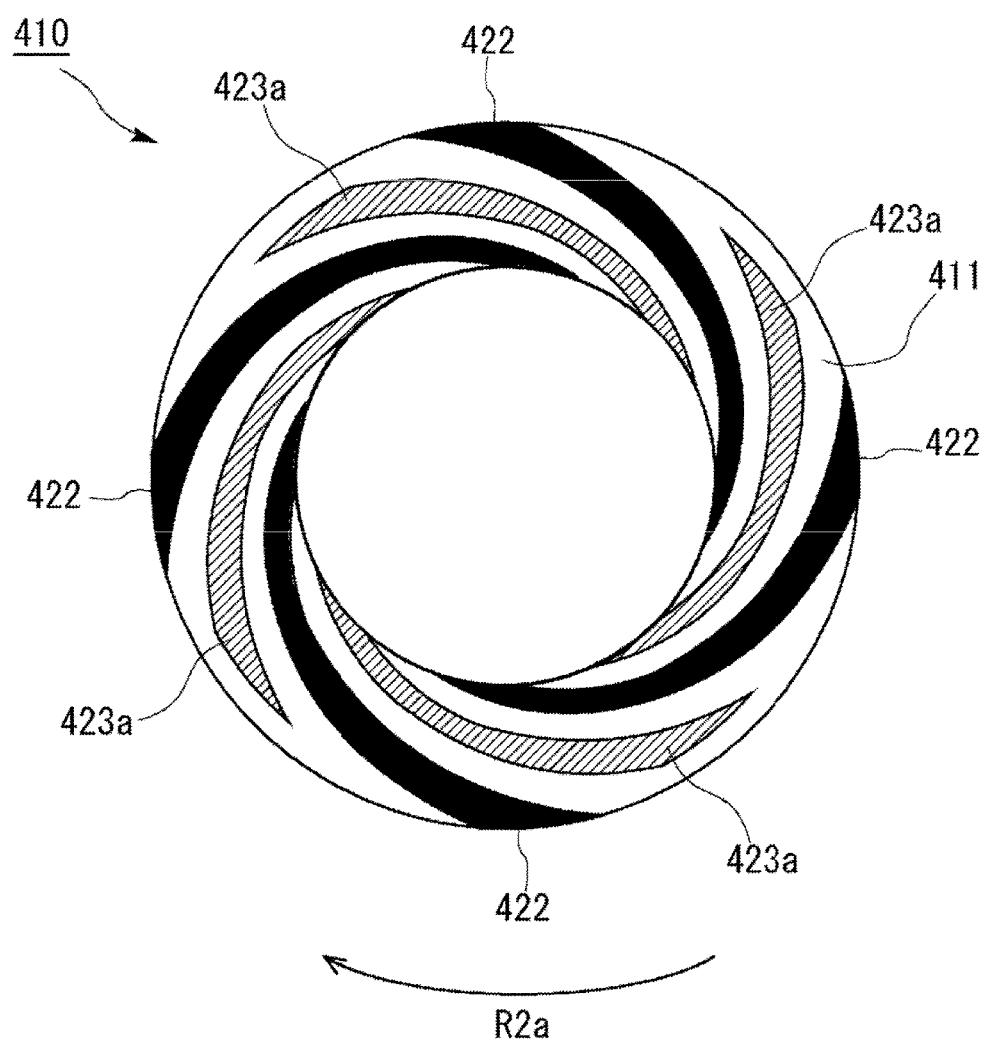
FIG. 12 is a diagram showing the depths of the grooves in the restrictor according to Variation Example 1.

FIG. 4 illustrates an example of another shape for the dynamic pressure generating grooves. FIG. 4, similarly to FIG. 2 described above, is a diagram of the plain bearing 410 as viewed from the restrictor 310 side in an axial direction and illustrates the configuration of the end face 411. The example shown in FIG. 4 is different from Embodiment 2 described above only in the shape of the dynamic pressure generating grooves formed in the end face 411, and other configurations are the same. Therefore, the difference only will be described below, and other configurations and effects will not be described again. The same constituent elements are given the same reference numerals. As shown in the drawing, the spirally extending dynamic pressure generating grooves 423a communicate only with the radially inner side of the end face 411 unlike the dynamic pressure generating grooves 423 of Embodiment 2. The direction to which the lubrication grooves 422 and dynamic pressure generating grooves 423a extend from the radially inner side of the end face 411 is opposite from the rotating direction of the impeller 400, i.e., the rotating direction of the plain bearing 410. Namely, as shown in FIG. 4, when the plain bearing 410 rotates clockwise as indicated with arrow R2a in the drawing, the lubrication grooves 422 and dynamic pressure generating grooves 423a are formed to extend counterclockwise from the radially inner side of the end face 411. Similarly to the embodiments described above, as shown in FIG. 12, the lubrication grooves 422 shown in black are formed deeper than the dynamic pressure generating grooves 423a indicated with hatched lines.

While the lubrication grooves 422 and dynamic pressure generating grooves 423a configured as described above are different from Embodiment 2 described above in that the cooling water is introduced from the radially inner side of the end face 411 when the impeller 400 rotates, they exhibit functions similar to those of the lubrication grooves and dynamic pressure generating grooves of Embodiment 2. Namely, when the impeller 400 rotates, the cooling water passes through the lubrication grooves 422 from the radially inner side to the outer side, and flows into the dynamic pressure generating grooves 423a from the radially inner side. This synergistically reduces the sliding resistance of the plain bearing 410 against the restrictor 310, by the lubrication of the end face 411 and the dynamic pressure generated by the dynamic pressure generating grooves 423a. Therefore, the plain bearing 410 that has the dynamic pressure generating grooves 423a is favorably applied to a pump designed to cause the cooling water to flow from the radially inner side to the outer side of the end face 411.

If the plain bearing 410 is made of a material that makes it difficult for the lubrication grooves and the like to be formed, for example, the lubrication grooves and dynamic pressure generating grooves may be formed in the end face 311 of the restrictor 310 instead of in the end face 411 of the plain bearing 410 unlike the embodiments described above. Hereinafter, pumps that adopt such a configuration will be described as variation examples of the present disclosure with reference to the drawings.

Variation examples 1 and 2 of the present disclosure will be described with reference to FIG. 5 to FIG. 7. While these variation examples differ from the embodiments described above in that the lubrication grooves and dynamic pressure generating grooves are formed in the end face 311 of the restrictor 310 instead of in the end face 411 of the plain bearing 410, their other configurations are the same. Therefore, the difference only will be described below, and other configurations and effects will not be described again. The same constituent elements are given the same reference numerals.

Figure 5:
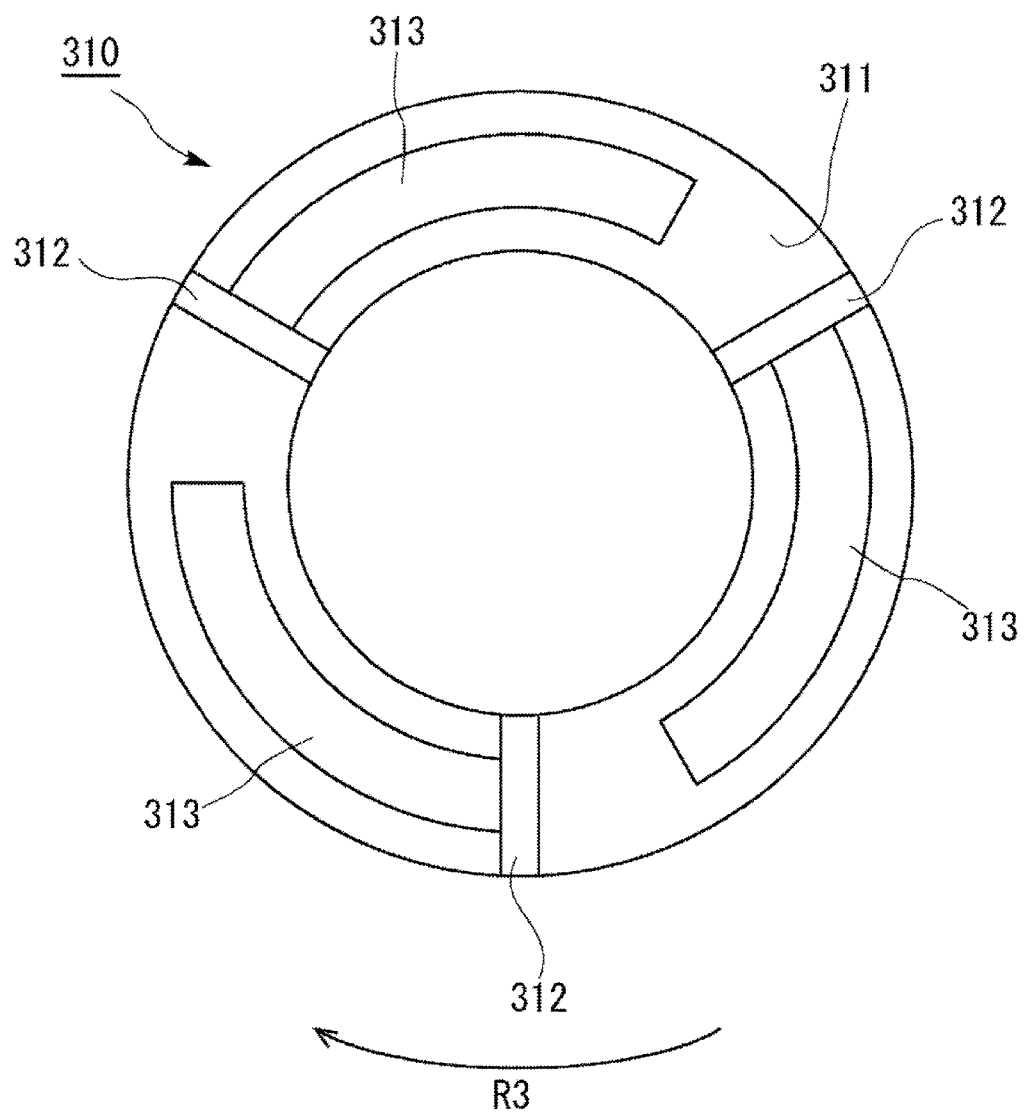
FIG. 5 is a diagram of a restrictor according to Variation Example 1 as viewed from an axial direction.

FIG. 5 is a diagram of the restrictor 310 according to Variation Example 1 as viewed from the plain bearing 410 side in an axial direction and illustrates the configuration of the end face 311. In the end face 311 are formed lubrication grooves 312 communicating with the radially inner side and outer side of the end face to supply cooling water onto the end face 311 for lubrication, and dynamic pressure generating grooves 313 that introduce a flow of cooling water created by the rotation of the impeller 400 to generate a dynamic pressure. The shapes and functions of the lubrication grooves 312 and dynamic pressure generating grooves 313 will not be described again since they are the same as the shapes and functions of the lubrication grooves 412 and dynamic pressure generating grooves 413 of Embodiment 1. That is, the lubrication grooves 312 and dynamic pressure generating grooves 313 are each formed to a depth similarly to that of the embodiment shown in FIG. 10, the lubrication grooves 312 being formed deeper than the dynamic pressure generating grooves 313. In this variation example, however, the dynamic pressure generating grooves 313 extend in the same direction as the rotating direction of the impeller 400, i.e., the rotating direction of the plain bearing 410. Namely, as shown in FIG. 5, when the plain bearing 410 rotates clockwise as indicated with arrow R3 in the drawing, the cooling water flows also clockwise. Therefore, the dynamic pressure generating grooves 313 are formed to extend clockwise from the lubrication grooves 312 so that their open ends face against the flow of cooling water. Since the lubrication grooves 312 communicate with both sides of the end face 311 in the radial direction, the cooling water can be introduced from both sides in the radial direction of the end face 311.

Figure 6:
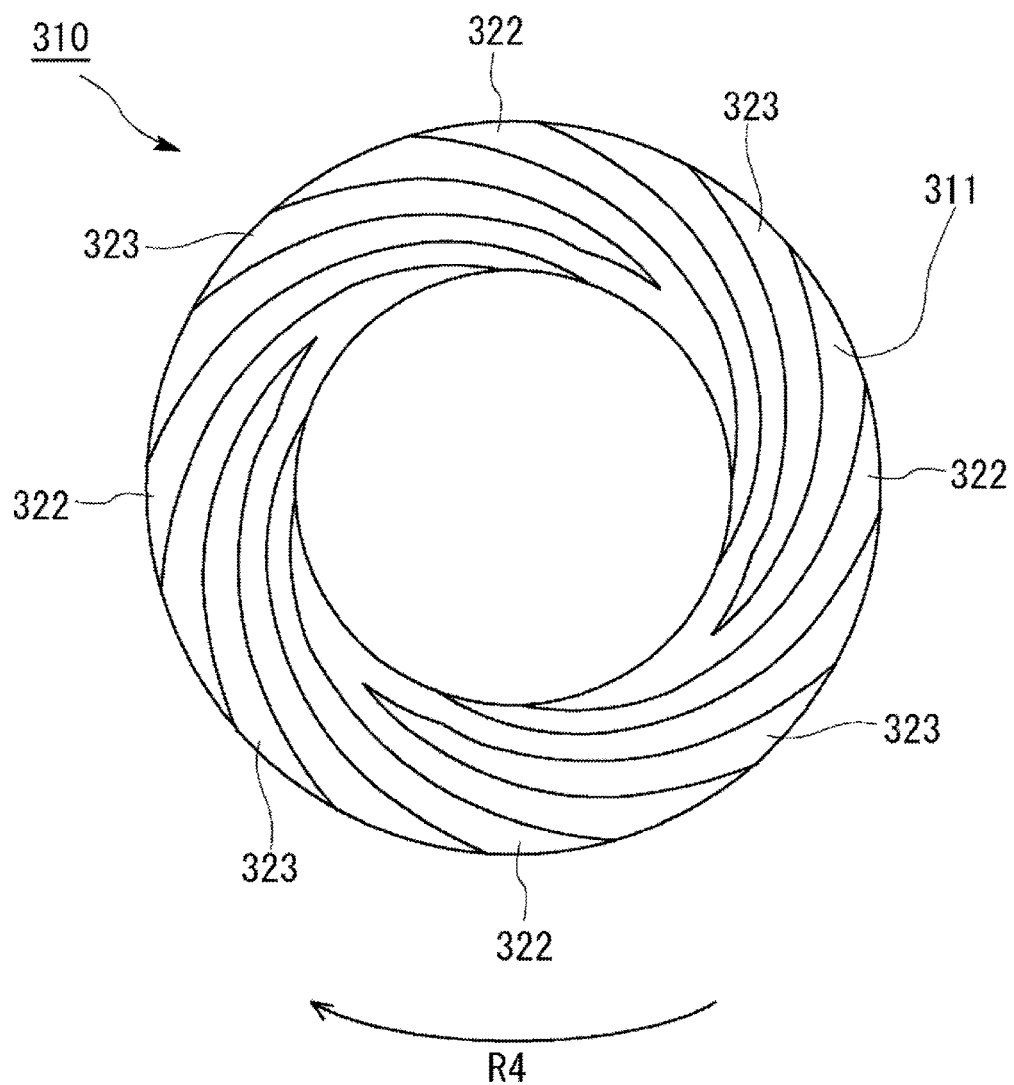
FIG. 6 is a diagram of a restrictor according to Variation Example 2 as viewed from an axial direction.
Figure 7:
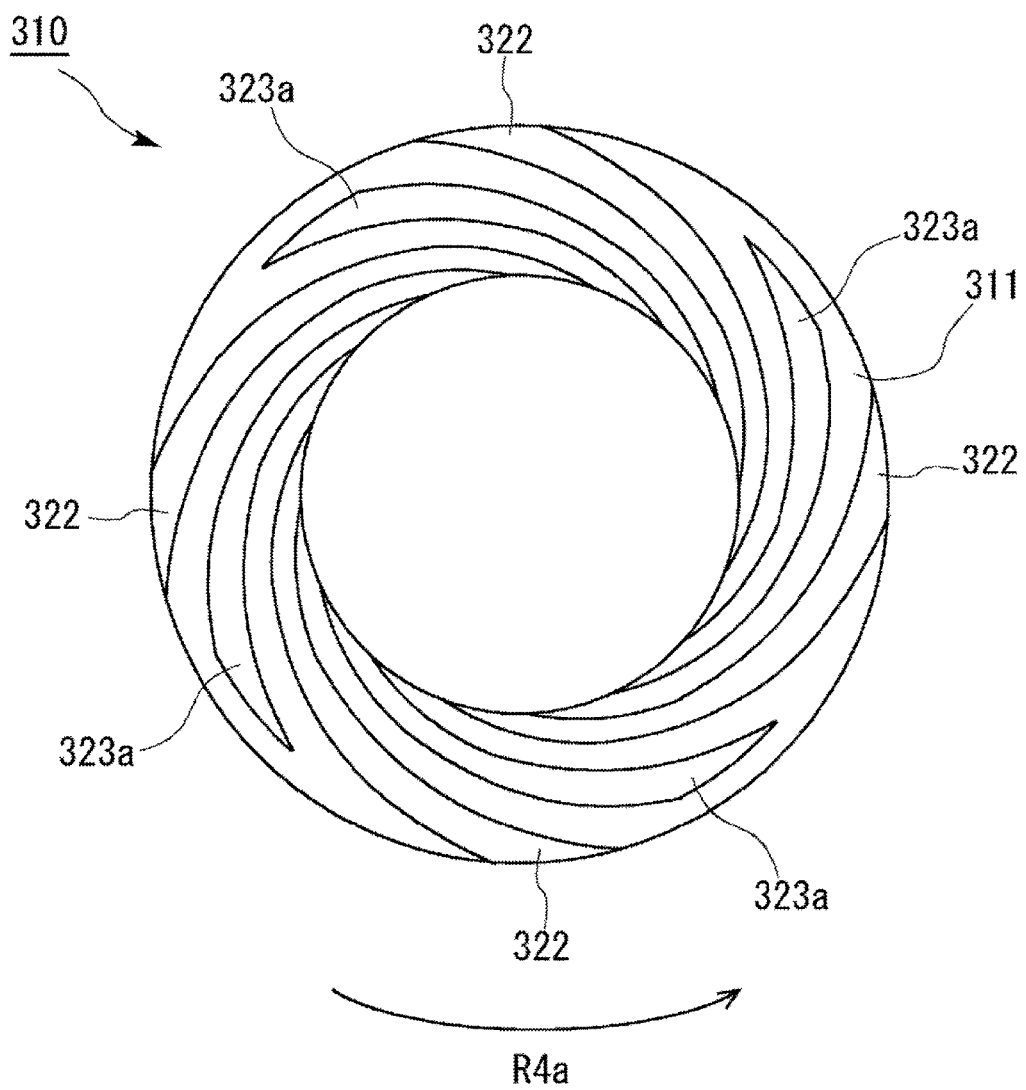
FIG. 7 is a diagram showing another shape of dynamic pressure generating grooves.

FIG. 6 is a diagram of the restrictor 310 according to Variation Example 2 as viewed from the plain bearing 410 side in an axial direction and illustrates the configuration of the end face 311. In the end face 311 are formed lubrication grooves 322 communicating with the radially inner side and outer side to supply cooling water onto the end face 311 for lubrication, and dynamic pressure generating grooves 323 that introduce a flow of cooling water created by the rotation of the impeller 400 to generate a dynamic pressure. The shapes and functions of the lubrication grooves 322 and dynamic pressure generating grooves 323 will not be described again since they are the same as the shapes and functions of the lubrication grooves 422 and dynamic pressure generating grooves 423 of Embodiment 2. That is, the lubrication grooves 322 and dynamic pressure generating grooves 323 are each formed to a depth similarly to that of the embodiment shown in FIG. 11, the lubrication grooves 322 being formed deeper than the dynamic pressure generating grooves 323. In this variation example, however, the direction to which the dynamic pressure generating groove 323 extends from the radially outer side of the end face 311 is the same as the rotating direction of the impeller 400, i.e., the rotating direction of the plain bearing 410. Namely, as shown in FIG. 6, when the plain bearing 410 rotates clockwise as indicated with arrow R4 in the drawing, the cooling water flows also clockwise. Therefore, the dynamic pressure generating grooves 323 are formed to extend clockwise from the radially outer side of the end face 311 so that their open ends face against the flow of cooling water. This way, the cooling water can be introduced from the radially outer side of the end face 311 during the rotation of the impeller 400.

In both variation examples configured as described above, the lubrication grooves and dynamic pressure generating grooves formed in the end face 311 of the restrictor 310 exhibit functions similar to those of the lubrication grooves and dynamic pressure generating grooves of Embodiments 1 and 2 described above. Namely, the lubrication grooves 312 and 322 formed in the end face 311 of the restrictor 310 provide lubrication on the end face 311, and the dynamic pressure generating grooves 313 and 323 formed in the end face 311 generate a dynamic pressure that acts on the end face 411 in a direction away from the restrictor 310. This way, the sliding resistance of the plain bearing 410 against the restrictor 310 is synergistically reduced. Thus the similar advantageous effects as those of the previously described embodiments are achieved. In both variation examples, the shapes and numbers of the lubrication grooves and dynamic pressure generating grooves formed in the end face 311 can be changed as required as long as the sliding resistance of the plain bearing 410 against the restrictor 310 is reduced. For example, as shown in FIG. 7, dynamic pressure generating grooves 323a that communicate only with the radially inner side of the end face 311, as with the dynamic pressure generating grooves of FIG. 4, may be provided instead of the dynamic pressure generating grooves 323 in Variation Example 2. In the example shown in FIG. 7, the direction to which the lubrication groove 322 and dynamic pressure generating groove 323a extend from the radially inner side of the end face 311 is the same as the rotating direction of the impeller 400, (direction of arrow R4a in the drawing). By forming the dynamic pressure generating grooves 323a such that their open ends face against the flow of cooling water this way, the cooling water can be introduced from the radially inner side of the end face 311 during the rotation of the impeller 400. In the example shown in FIG. 7, too, the lubrication grooves 322 and dynamic pressure generating grooves 323a are each formed to a depth similarly to that of the embodiment shown in FIG. 12, the lubrication grooves 322 being formed deeper than the dynamic pressure generating grooves 323a.

A carbon material is generally more brittle than other materials and consistent formation of grooves in the carbon material may be hard to achieve. When carbon is adopted as the material of the plain bearing 410, therefore, it is preferable to adopt the configuration in which the lubrication grooves and dynamic pressure generating grooves are formed in the end face 311 of the restrictor 310 as shown in FIG. 5 to FIG. 7.

Figure 8:
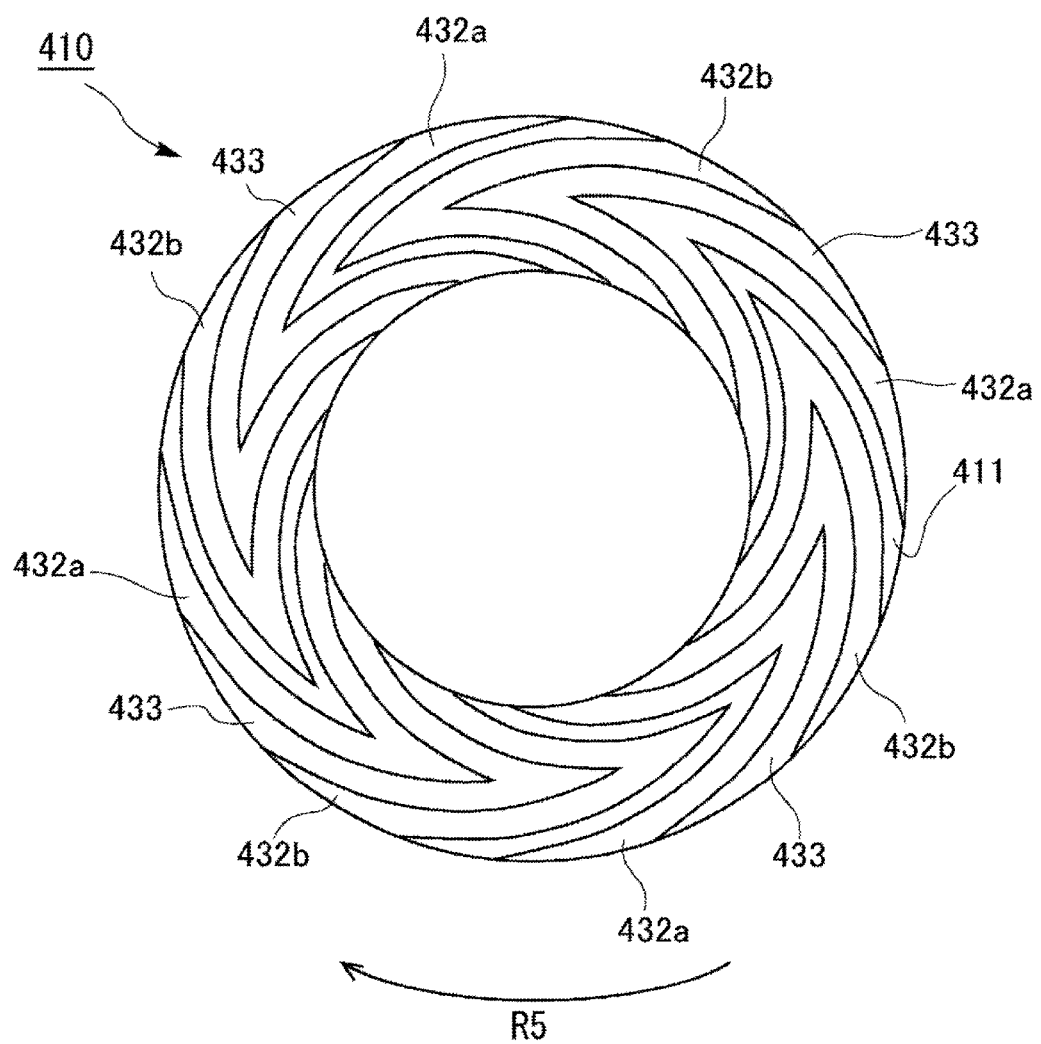
FIG. 8 is a diagram showing other shapes of lubrication grooves and dynamic pressure generating grooves.
Figure 9:
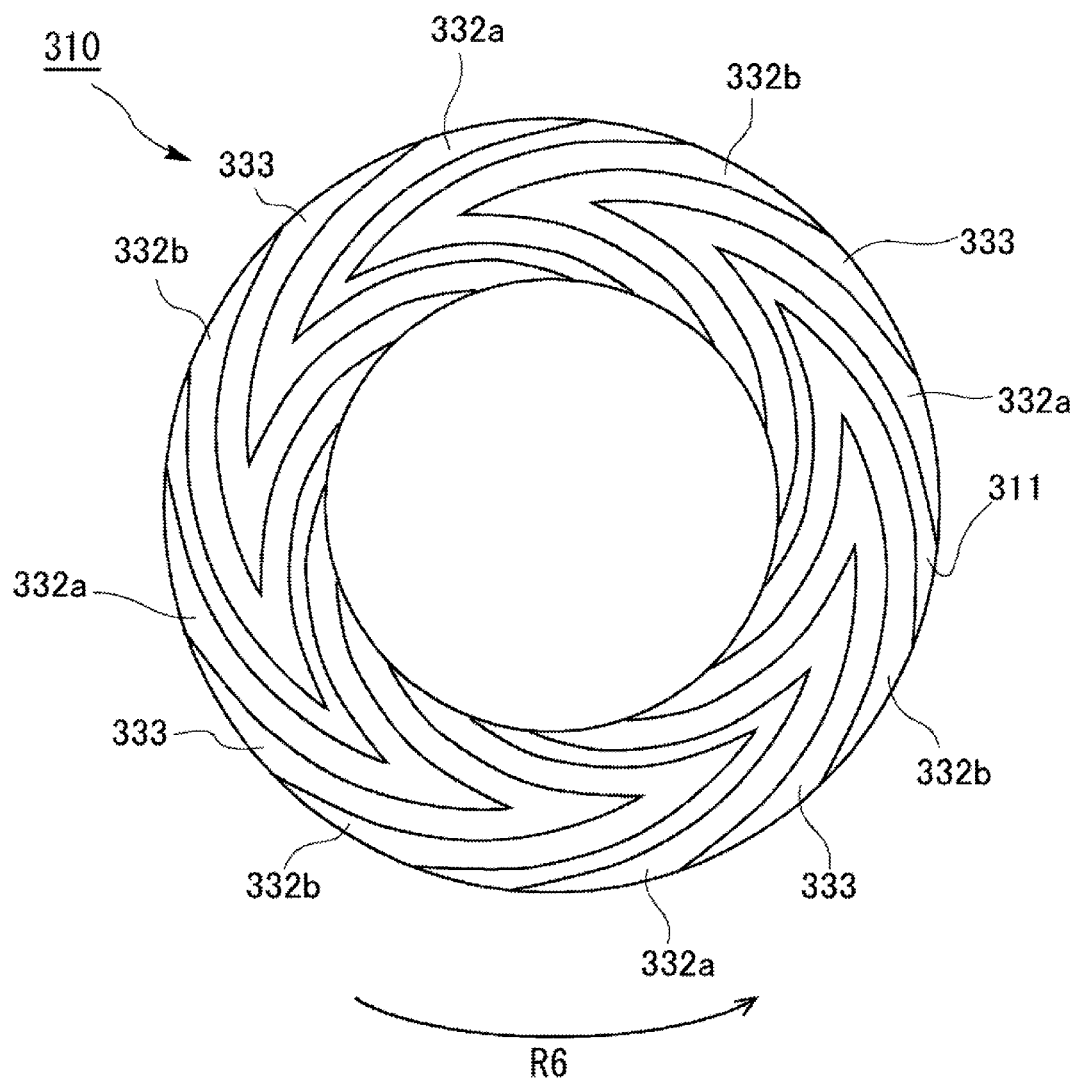
FIG. 9 is a diagram showing other shapes of lubrication grooves and dynamic pressure generating grooves.
Figure 13:
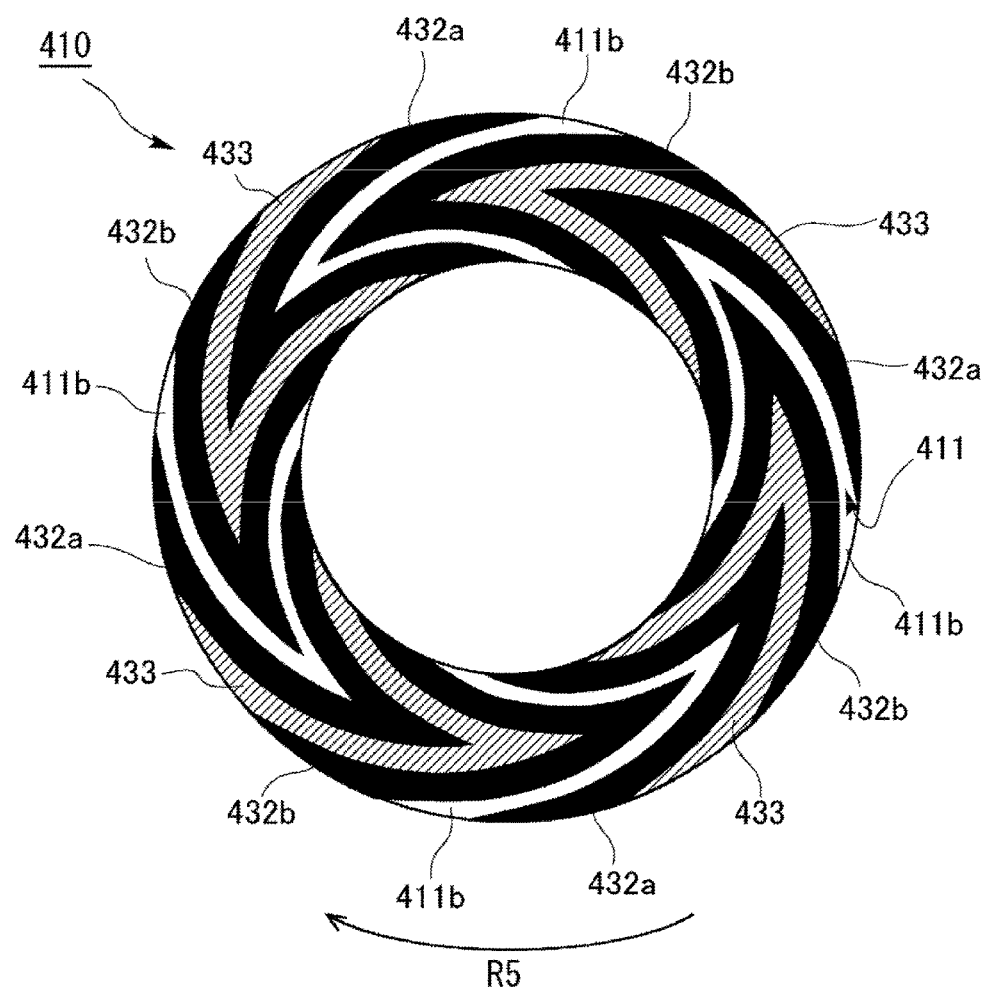
FIG. 13 is a diagram showing the depths of the grooves shown in FIG. 8.

Instead of the shapes described above, the shapes illustrated in FIG. 8 and FIG. 9 may be adopted for the lubrication grooves and dynamic pressure generating grooves. FIG. 8 is a diagram similar to FIG. 2 described above. In the end face 411 are formed circumferentially extending, substantially V-shaped lubrication grooves 432a, dynamic pressure generating grooves 433, and lubrication grooves 432b arranged in this order (known as a herringbone pattern), adjacent to each other along the circumferential direction in which the apexes (tips) of the V shape are oriented. Four lubrication grooves 432a and 432b and dynamic pressure generating grooves 433 each are formed, and these all communicate with the radially inner side and outer side of the end face 411. That is, a set of grooves, consisting of lubrication grooves 432a and 432b and a dynamic pressure generating groove 433 adjacent to each other, are circumferentially spaced apart from each other. Of the two groove parts bifurcating and extending from the apex of the V shape of each groove, one communicates with the radially inner side (inner circumferential side) of the end face 411, while the other communicates with the radially outer side (outer circumferential side) of the end face 411. In the example shown in FIG. 8, lubrication grooves 432a and 432b and dynamic pressure generating grooves 433 all have the same shape (contour), but the dynamic pressure generating grooves 433 are formed shallower than the lubrication grooves 432a and 432b. Therefore, as shown in FIG. 13, the lubrication grooves 432a and 432b shown in black are formed deeper than the dynamic pressure generating grooves 433 indicated with hatched lines. Between sets of grooves, there are provided flat portions 411b where no grooves are formed. The direction to which the lubrication grooves 432a and 432b and dynamic pressure generating grooves 433 extend (direction to which the tips of the V shape are oriented) is opposite from the rotating direction of the plain bearing 410. Namely, when the plain bearing 410 rotates clockwise as indicated with arrow R5 in the drawing, the lubrication grooves 432a and 432b and dynamic pressure generating grooves 433 are formed to extend counterclockwise so that their open ends face against the with respect flow of cooling water. The lubrication grooves 432a and 432b and dynamic pressure generating grooves 433 configured as described above exhibit functions similar to those of the lubrication grooves and dynamic pressure generating grooves of the previously described embodiments. When the lubrication grooves and dynamic pressure generating grooves in the herringbone pattern are formed similarly in the end face 311 of the restrictor 310, the configuration would be as shown in FIG. 9. FIG. 9 is a diagram similar to FIG. 5 described above. Therefore, in the example shown in FIG. 9, too, the lubrication grooves 332a and 332b and dynamic pressure generating grooves 333 are each formed to a depth similarly to that of the embodiment shown in FIG. 13, the lubrication grooves 332a and 332b being formed deeper than the dynamic pressure generating grooves 333. The direction to which the lubrication grooves 332a and 332b and dynamic pressure generating grooves 333 extend is the same as the rotating direction of the plain bearing 410 (direction of arrow R6 in the drawing). In this way, the lubrication grooves 332a and 332b and dynamic pressure generating grooves 333 are formed such that their open ends face against the flow of cooling water. With the grooves in the herringbone pattern formed as described above, the cooling water can favorably be introduced from both sides in the radial direction of the end face 411 (or end face 311).

Figure 14:
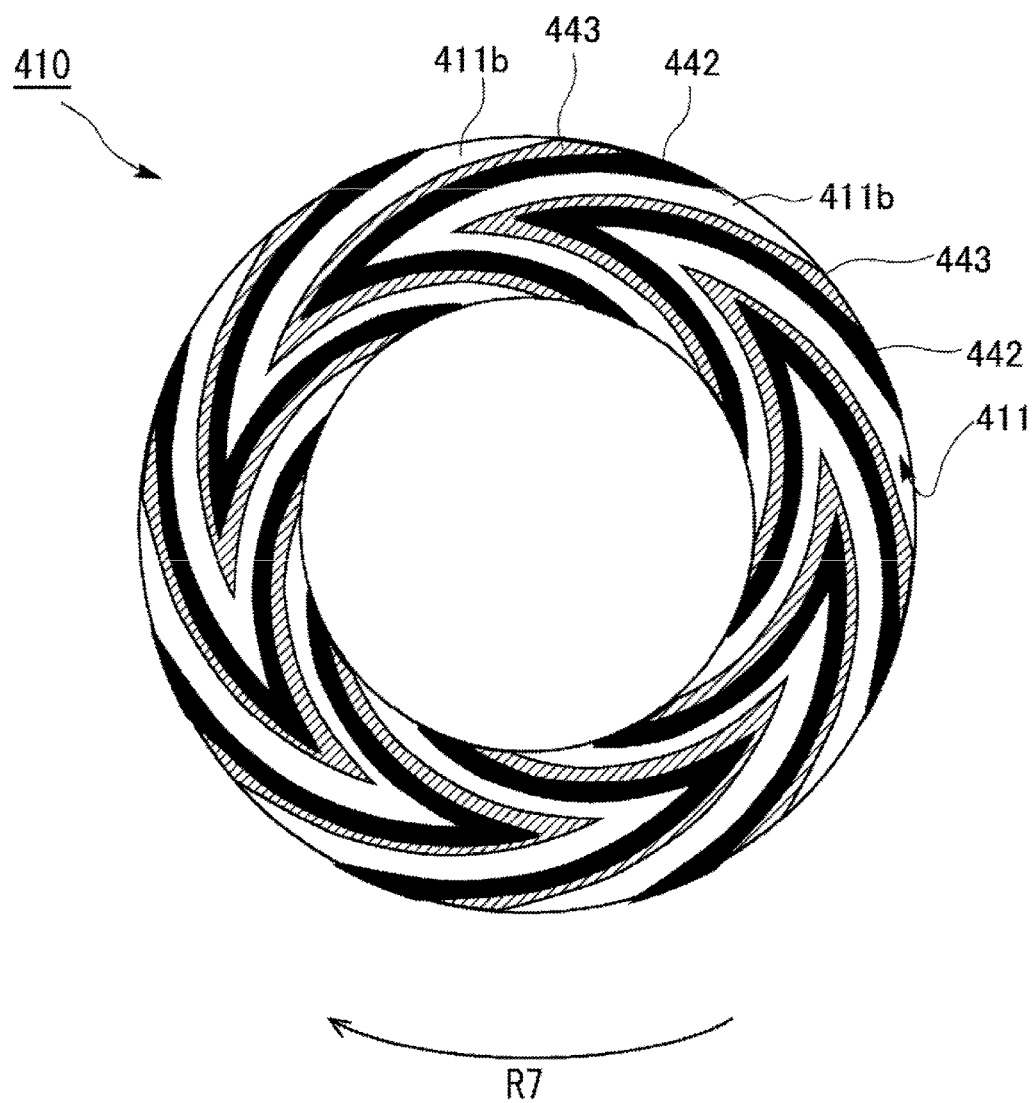
FIG. 14 is a diagram showing other shapes and depths of lubrication grooves and dynamic pressure generating grooves provided in an end face of the plain bearing.
Figure 15:
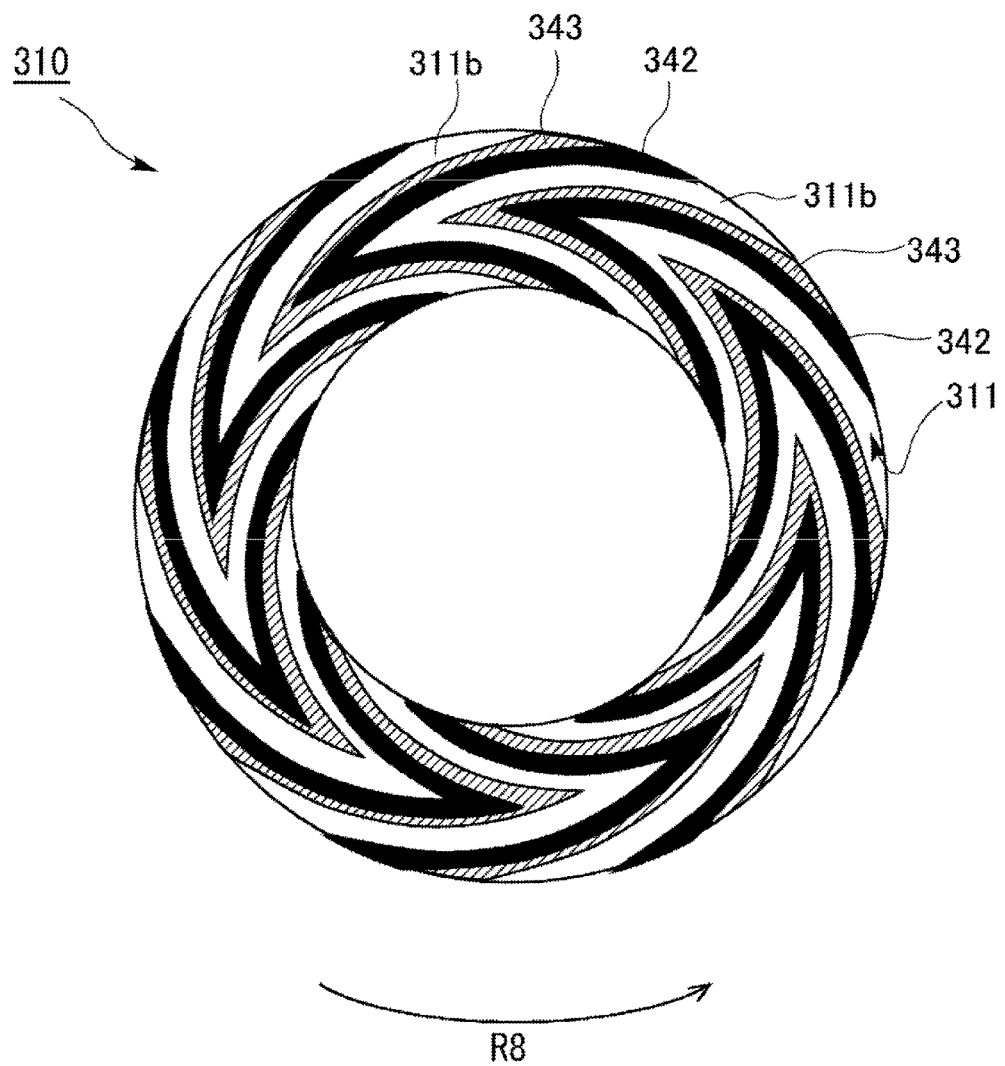
FIG. 15 is a diagram showing other shapes and depths of lubrication grooves and dynamic pressure generating grooves provided in an end face of the restrictor.

Instead of the shapes described above, the shapes illustrated in FIG. 14 and FIG. 15 may be adopted for the lubrication grooves and dynamic pressure generating grooves. FIGS. 14 and 15 show grooves formed in a V-shape pattern (herringbone pattern) different from that of the grooves shown in FIGS. 8 and 9. As shown in FIG. 14, lubrication grooves 442 shown in black, dynamic pressure generating grooves 443 indicated with hatched lines, and flat portions 411b of the end face 411 where no grooves are formed are arranged in this order adjacent to each other along the circumferential direction to which the apexes of the V shape are oriented. Not to mention, the flat portions 411b are V-shaped, too. Eight lubrication grooves 442 and dynamic pressure generating grooves 443 each are formed, and these all communicate with the radially inner side and outer side of the end face 411. In the example shown in FIG. 14, the lubrication grooves 442 shown in black are formed deeper than the dynamic pressure generating grooves 443 indicated with hatched lines. The direction to which the lubrication grooves 442 and dynamic pressure generating grooves 443 extend (direction to which the apexes (tips) of the V shape are oriented) is opposite from the rotating direction of the plain bearing 410 indicated with arrow R7 in the drawing. The lubrication grooves 442 and dynamic pressure generating grooves 443 configured as described above also exhibit functions similar to those of the lubrication grooves and dynamic pressure generating grooves of the previously described embodiments. In the example shown in FIG. 14, the plain bearing 410 rotates in the direction of arrow R7, so that the cooling water flows counterclockwise into the lubrication grooves 442 and dynamic pressure generating grooves 443. The cooling water that flowed into the lubrication grooves 442, in particular, can further flow into adjacent dynamic pressure generating grooves 443. The cooling water that flowed into the dynamic pressure generating grooves 443 flows out onto adjacent flat portions 411b. When the cooling water flows out onto the flat portions 411b, a dynamic pressure is generated effectively particularly at the tips of the dynamic pressure generating grooves 443. That is, in this example, the shallower dynamic pressure generating grooves 443 are provided adjacent to and downstream of the lubrication grooves 442 (downstream in the flow of cooling water), and moreover, there are provided flat portions 411b downstream of the dynamic pressure generating grooves 443, so that the dynamic pressure generating effect is achieved more effectively. This dynamic pressure generating effect is achieved more evidently as compared to the example wherein the dynamic pressure generating groove 443 is sandwiched between the deeper lubrication grooves 432a and 432b as shown in FIGS. 8 and 13 described above.

When the lubrication grooves, dynamic pressure generating grooves, and flat portions having similar shapes as the V-shape pattern shown in FIG. 14 are formed in the end face 311 of the restrictor 310, the configuration would be as shown in FIG. 15. The lubrication grooves 342 shown in black here are formed deeper than the dynamic pressure generating grooves 343 indicated with hatched lines. The flat portions 311b where no grooves are formed are provided adjacent to the dynamic pressure generating grooves 343. Therefore, in the example shown in FIG. 15, too, a significant dynamic pressure generating effect is achieved as with the example shown in FIG. 14.

The pump to which the plain bearing according to the present disclosure is applicable is not limited to the pump described above. The present disclosure can also be applied to a pump that has a plurality of fixed coils (stator), as the mechanism for rotating the impeller, instead of the outer magnets 520 that rotate with the bracket 510 described above, the impeller being rotated by controlled power application to the coils. The present disclosure can be applied, not only to magnet-type pumps wherein the impeller is rotated by a magnetic force, but also to pumps with various rotation mechanisms.

Embodiment 3

Next, Embodiment 3 of the present disclosure will be described with reference to FIG. 16. This embodiment is different from Embodiment 1 described above only in that the restrictor, which is a restricting part for restricting axial movement of the plain bearing 410, is provided on both sides in the axial direction of the plain bearing 410, and other configurations are the same. Therefore, the difference only will be described below, and other configurations and effects will not be described again. The same constituent elements are given the same reference numerals.

Figure 16:
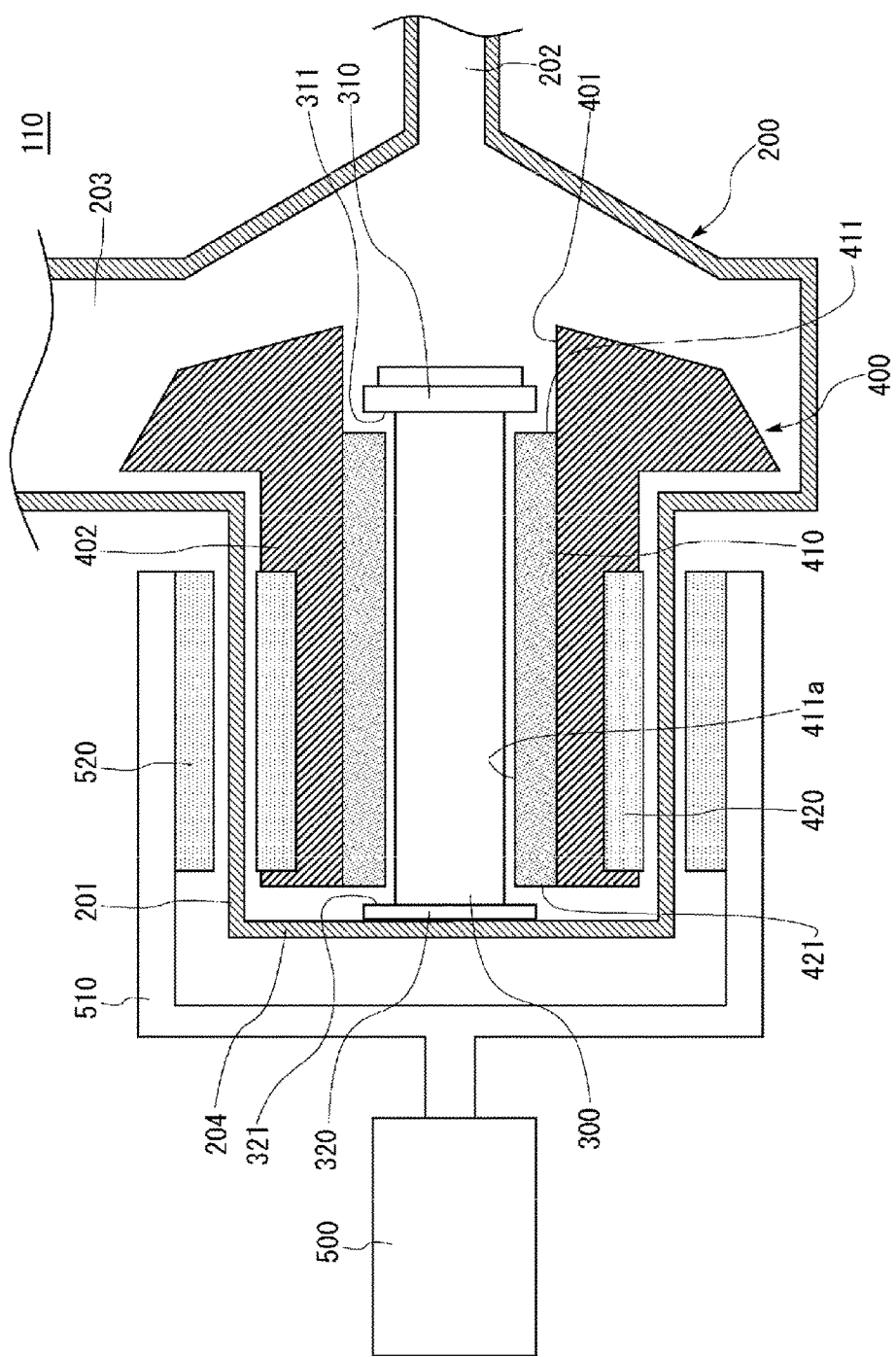
FIG. 16 is a schematic cross-sectional view of a pump according to Embodiment 3.

FIG. 16 is a schematic cross-sectional view of the pump 110 according to this embodiment similar to FIG. 1 described above. In addition to the configurations of the pump 100 shown in FIG. 1, the pump 110 includes a restrictor 320 as a second annular restricting part. The restrictor 320 is fixed to a side face 204 on the left side in the drawing of the cylindrical part 201 of the housing 200. The shape, material, and fixing method of the restrictor 320 are the same as those of the restrictor 310. Between an end face 421 of the plain bearing 410 facing the restrictor 320 (end face on the left side in FIG. 16) and an end face 321 of the restrictor 320 facing the plain bearing 410 (end face on the right side in FIG. 16) remains a very small gap.

In this embodiment, lubrication grooves and dynamic pressure generating grooves are formed in the end face 421 of the plain bearing 410 similarly to the end face 411. Note, the rotating direction of the plain bearing 410 when the end face 411 is viewed from the front is opposite from that when the end face 421 is viewed from the front. Therefore, the shapes of the grooves formed in the end face 421 are the laterally inverted ones of the shapes shown in FIGS. 2 to 4, 8, and 14. Similarly to the lubrication grooves and dynamic pressure generating grooves formed in the end face 411, the lubrication grooves in the end face 421 are formed deeper than the dynamic pressure generating grooves. Each of the grooves formed in both end faces 411 and 421 may have the same shape except that they are inverted left to right (for example, the shape shown in FIG. 2 may be adopted for both of the end faces 411 and 421), or may employ different shapes (for example, the shape shown in FIG. 2 may be adopted for the end face 411, while the laterally inverted one of the shape shown in FIG. 3 may be adopted for the end face 421). Each of the grooves may have other depths and shapes as long as they exhibit their functions.

In the pump 110 according to this embodiment, the sliding resistance of the plain bearing 410 against the restrictor 320 is synergistically reduced by the grooves formed in the end face 421 of the plain bearing 410. Therefore, even when the impeller 400 moves toward the restrictor 320 during high speed rotation of the impeller 400, the sliding resistance of the plain bearing 410 against the restrictor 320 can be reduced. Namely, with the pump 110, in combination with the effect by the grooves formed in the end face 411, the sliding resistance of the plain bearing 410 against the restrictor can be reduced even when the impeller 400 moves in whichever axial direction, so that an increase in rotation torque of the impeller 400 can be minimized.

As already mentioned before, the configurations described in Embodiment 2 and variation examples above, i.e., other shapes of the lubrication grooves and dynamic pressure generating grooves formed in the end face 411 of the plain bearing 410 are applicable to the lubrication grooves and dynamic pressure generating grooves similarly formed in the end face 421. Further, if the plain bearing 410 is made of a material that makes it difficult for grooves to be formed, such as carbon, for example, the lubrication grooves and dynamic pressure generating grooves may be formed in the end face 321 of the restrictor 320 instead of in the end face 421 of the plain bearing 410 similarly to the variation examples described above. In this case, too, the rotating direction of the plain bearing 410 when the end face 311 is viewed from the front is opposite from that when the end face 321 is viewed from the front. Therefore, the shapes of the grooves formed in the end face 321 are the laterally inverted ones of the shapes shown in FIGS. 5 to 7, 9, and 15. Similarly to the lubrication grooves and dynamic pressure generating grooves formed in the end face 311, the lubrication grooves in the end face 321 are formed deeper than the dynamic pressure generating grooves. Each of the grooves formed in both end faces 311 and 321 may have the same shape except that they are inverted left to right, or may have different shapes, as with the case with the grooves formed in both end faces 411 and 421 of the plain bearing 410. Each of the grooves may have other depths and shapes as long as they exhibit their functions.

Another configuration may also be adopted, wherein lubrication grooves and dynamic pressure generating grooves are provided in the end face of the plain bearing 410 on one side in the axial direction of the plain bearing, 410, while lubrication grooves and dynamic pressure generating grooves are provided in the end face of the restrictor on the other side. In this case, too, any of the shapes illustrated in the examples described above may be adopted as suited for each groove. Further, the lubrication grooves and dynamic pressure generating grooves may be provided to only one of both sides in the axial direction of the plain bearing 410, for reducing the sliding resistance between the end face of the plain bearing 410 and the end face of the restrictor. That is, in the configuration shown in FIG. 16, the lubrication grooves and dynamic pressure generating grooves may be provided in only one of both end faces 411 and 421 of the plain bearing 410, or, in only one of the end face 311 of the restrictor 310 and the end face 321 of the restrictor 320. In such a configuration, too, the sliding resistance between the plain bearing 410 and the restrictor can be reduced at least on the side of the plain bearing 410 where the lubrication grooves and dynamic pressure generating grooves are provided, so that an increase in rotation torque of the impeller 400 can be minimized. Further, when there are formed grooves in the end face 421 of the plain bearing 410, the restrictor 320 need not be provided. In this case, too, the grooves formed in the end face 421 can provide the effect of reducing the sliding resistance between the side face 204 of the housing 200 and the end face 421.

Embodiment 4

Next, Embodiment 4 of the present disclosure will be described with reference to FIG. 17. This embodiment adopts a configuration wherein the annular restrictor that restricts the axial movement of the plain bearing is integrally fixed to the shaft. Namely, in this embodiment, a stepped shaft is employed, as a shaft having an annular restrictor integrally fixed thereto. The major difference, therefore, of this embodiment from the previously described embodiments is that the shaft in the pump includes a small-diameter part that is passed through the shaft hole in the plain bearing and a large-diameter part having a larger diameter than the small-diameter part, and the annular restrictor fixed to the shaft is formed by this large-diameter part. This embodiment is also different from the previously described embodiments in that a stator having a plurality of fixed coils is used as the mechanism for rotating the impeller. Therefore, basically, major differences will be described in detail below, and description of other configurations and effects will be omitted where appropriate. The same constituent elements, in particular, or the elements having substantially the same functions even though their shapes or the like are not completely the same, are given the same reference numerals and their particulars will be omitted from the description where appropriate.

Figure 17:
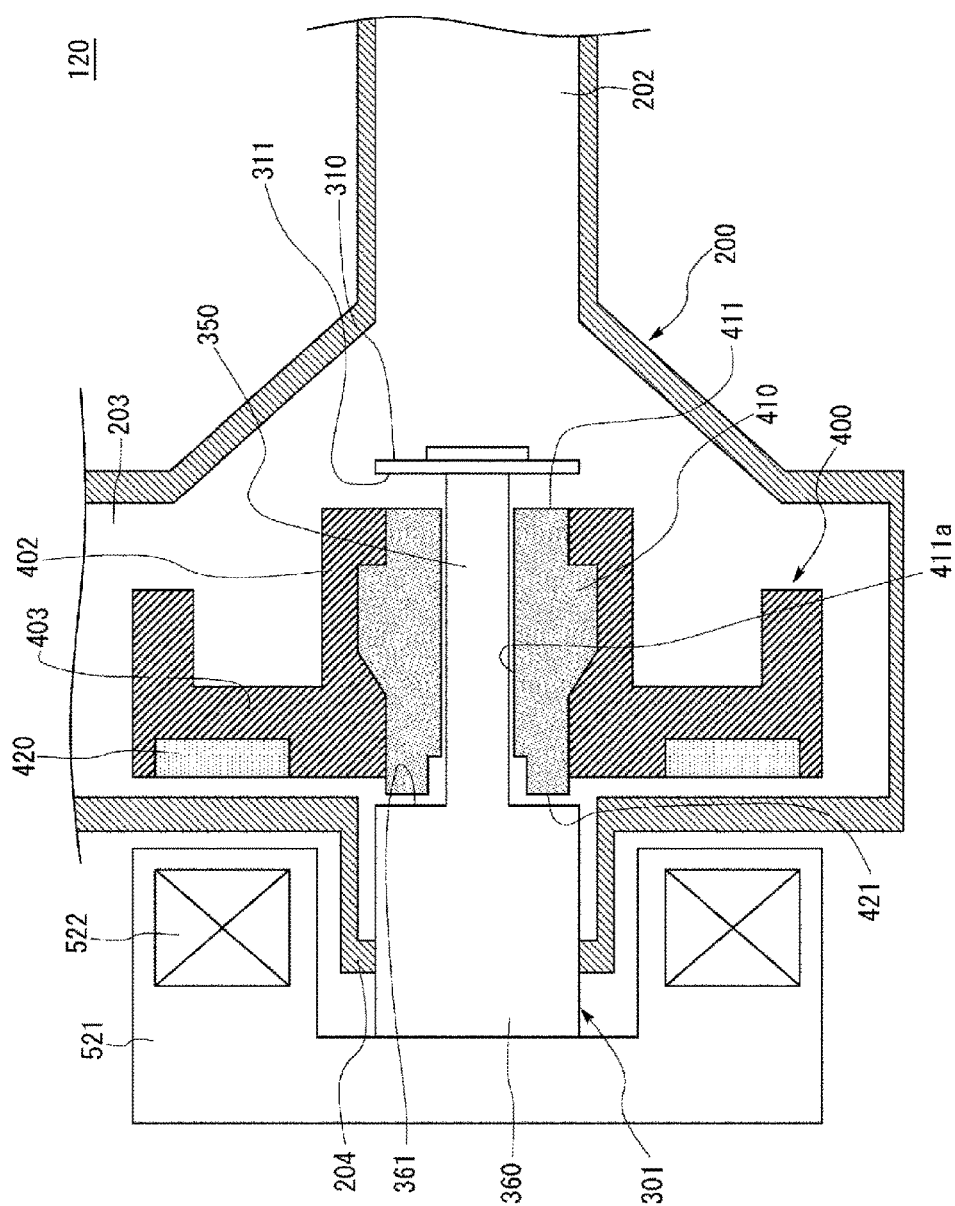
FIG. 17 is a schematic cross-sectional view of a pump according to Embodiment 4.

FIG. 17 is a schematic cross-sectional view of the pump 120 according to Embodiment 4. It is a schematic cross-sectional view similar to FIG. 1. The pump 120 is provided with a shaft 301 fixed to a side face 204 of the housing 200. The shaft 301 includes a small-diameter part 350 passed through a shaft hole 411a of the plain bearing 410 and a large-diameter part 360 having a larger diameter than the small-diameter part 350. That is, the shaft 301 is made up of the small-diameter part 350 and large-diameter part 360 integrally fixed to each other. The shaft 301 having the small-diameter part 350 and large-diameter part 360 integrally fixed to each other (integrally formed) can be produced from a single shaft, wherein the small-diameter part 350 is formed by a cutting process or the like. The large-diameter part 360 is provided on the left side in the drawing of the shaft 301. On the right side in the drawing of the shaft 301 is provided the restrictor 310 described above. In the impeller 400 of the pump 120, an annular flange part 403 is provided on the radially outer side of the body part 402, and inner magnets 420 are provided on the left side in the drawing of the flange part 403. There are provided a plurality of circumferentially equally spaced inner magnets 420. The impeller 400 is formed by insert molding, with the plain bearing 410 and inner magnets 420 as inserts, to be integral with them. A stator 521 is provided outside the housing 200 (left side in the drawing) as the mechanism for rotating the impeller 400. The stator 521 includes circumferentially equally spaced coils 522. As the current supplied to the coils 522 is controlled by a controller (not shown), the magnetic force between the coils 522 and opposite inner magnets 420 changes, whereby the impeller 400 rotates with respect to the shaft 301.

In this embodiment, the large-diameter part 360 functions as an annular restrictor that is integrally fixed to the shaft 301 and restricts the axial movement of the plain bearing 410. Between an end face 421 of the plain bearing 410 facing the large-diameter part 360 (end face on the left side in FIG. 17) and an end face 361 of the large-diameter part 360 facing the plain bearing 410 (end face on the right side in FIG. 17, annular stepped surface) remains a very small gap. Thus, the impeller 400 is mounted to the shaft 301 such that it is allowed to move in the axial direction to some extent.

In this embodiment, lubrication grooves and dynamic pressure generating grooves are formed in the end face 361 of the large-diameter part 360. Any of laterally inverted ones of the shapes shown in FIGS. 5 to 7, 9, and 15 may be adopted for the shapes of the grooves formed in the end face 361, as with the case with forming lubrication grooves and dynamic pressure generating grooves in the end face 321 in Embodiment 3 described above. Thus, in the pump 120, the sliding resistance of the plain bearing 410 against the large-diameter part 360 is synergistically reduced by the grooves formed in the end face 361 of the large-diameter part 360. Therefore, even when the impeller 400 moves toward the large-diameter part 360 during high speed rotation of the impeller 400, the sliding resistance of the plain bearing 410 against the large-diameter part 360 can be reduced, so that an increase in rotation torque of the impeller 400 can be minimized.

Moreover, with the pump 120, there is no need to provide the restrictor 320 in Embodiment 3, so that an increase in rotation torque of the impeller 400 (rotation torque when the impeller moves to the left of the drawing) can be minimized without increasing the number of components. Since the impeller 400 is integrally formed by insert molding, the plain bearing 410 made of carbon need not be machined with high precision on the outer circumferential side. Therefore, the number of production steps of the impeller 400 can be reduced. Also, since it is not necessary to press-fit the plain bearing 410 into the shaft hole of the impeller 400, a possible breakage of the plain bearing 410 during the production of the impeller 400 is avoided.

Each of the grooves formed in the end face 361 may have various depths and shapes as long as they exhibit their functions. Instead of forming grooves in the end face 361 of the large-diameter part 360, the restrictor 320 having the lubrication grooves and dynamic pressure generating grooves of Embodiment 3 formed thereto may be fixed to the end face 361. Alternatively, the lubrication grooves and dynamic pressure generating grooves may be formed in the end face 421 of the plain bearing 410 instead of in the end face 361. In this case, the configuration of the lubrication grooves and dynamic pressure generating grooves is the same as explained in Embodiment 3 above. As with the previously described embodiments, the sliding resistance between the end face 411 of the plain bearing 410 and the end face 311 of the restrictor 310 can be reduced by forming grooves in either one of the end face 411 and end face 311. Further, as with Embodiment 3 described above, the lubrication grooves and dynamic pressure generating grooves may be provided in only one of both end faces 411 and 421 of the plain bearing 410, or, in only one of the end face 311 of the restrictor 310 and the end face 361 of the large-diameter part 360. Furthermore, the restrictor 310 on the right side of the drawing may be formed by a second large-diameter part integrally fixed to the shaft 301, similarly to the large-diameter part 360. The effect the present disclosure intends to provide will be achieved in any of these configurations, too.

Embodiment 5

Next, Embodiment 5 of the present disclosure will be described with reference to FIG. 18. This embodiment adopts a configuration wherein an impeller fixed to the shaft rotates with respect to the housing. Namely, in this embodiment, the shaft rotates with respect to the housing, while the impeller is fixed to the shaft and rotates with the shaft with respect to the housing. The plain bearing rotatably supports the shaft so as to rotatably support the impeller with respect to the housing. Therefore, basically, major differences will be described in detail below, and description of other configurations and effects will be omitted where appropriate. The same constituent elements, in particular, or the elements having substantially the same functions even though their shapes or the like are not completely the same, are given the same reference numerals and their particulars will be omitted from the description where appropriate.

Figure 18:
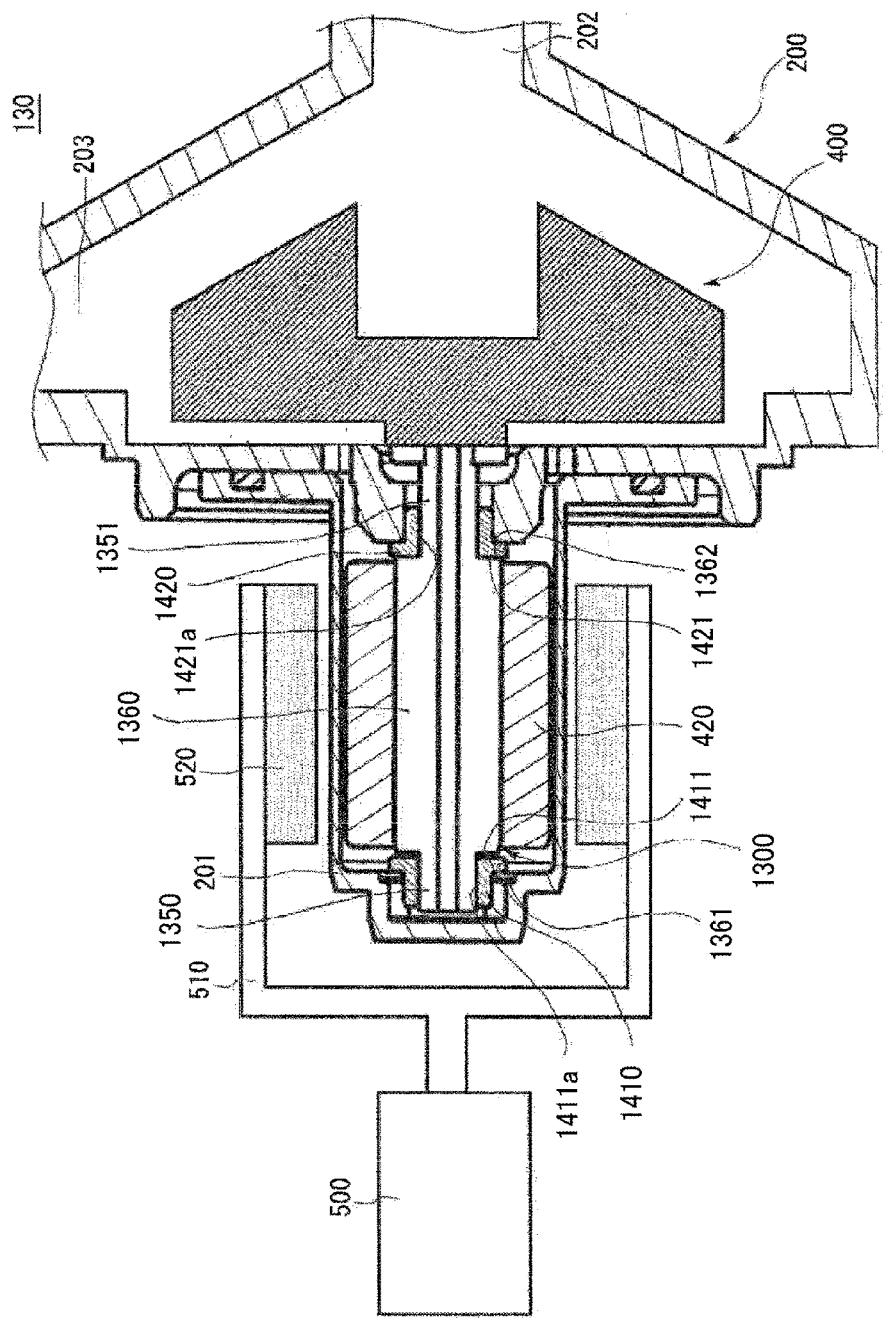
FIG. 18 is a schematic cross-sectional view of a pump according to Embodiment 5.

FIG. 18 is a schematic cross-sectional view of the pump 130 according to Embodiment 5. It is a schematic cross-sectional view similar to FIG. 1. The shaft 1300 of the pump 130 rotates with respect to the housing 200. More particularly, the shaft 1300 is rotatably supported with respect to the housing 200 by a pair of plain bearings 1410 and 1420 that are fixed to the housing 200. The material and the like of the plain bearings 1410 and 1420 are the same as those of the plain bearing in the previous embodiments. The plain bearings 1410 and 1420 are formed in an L shape in cross section as shown in FIG. 18, including an axially extending cylindrical part and a radially extending flange part, and fixed to an attachment part (attachment hole) of the housing, with the cylindrical parts being press-fitted into the holes. In this embodiment, the impeller 400 is fixed to the shaft 1300 and rotates with the shaft 1300 with respect to the housing 200. The plain bearings 1410 and 1420 rotatably support the shaft 1300 so as to rotatably support the impeller 400 with respect to the housing 200.

The shaft 1300 includes a small-diameter part 1350 passed through a shaft hole 1411a of the plain bearing 1410, a small-diameter part 1351 passed through a shaft hole 1421a of the plain bearing 1420, and a large-diameter part 1360 having a larger diameter than either of the small-diameter parts 1350 and 1351. That is, the shaft 1300 is made up of the small-diameter parts 1350 and 1351 and the large-diameter part 1360 integrally fixed to each other. The production method and the like of the shaft 1300 are the same as those of the shaft 301 described above.

In the pump 130, inner magnets 420 are provided on the outer circumference of the large-diameter part 1360 of the shaft 1300. There are provided a plurality of circumferentially equally spaced inner magnets 420, and there is formed an annular gap between the inner magnets 420 and the inner circumferential surface of the cylindrical part 201. A bracket 510 that is rotated by a motor 500, which is the mechanism for rotating the impeller 400 with the shaft 1300, is provided such as to surround the cylindrical part 201 of the housing 200. Outer magnets 520 are provided in the bracket 510 at positions opposite the inner magnets 420 of the impeller 400.

In this embodiment, the large-diameter part 1360 functions as an annular restrictor that is integrally fixed to the shaft 1300 and restricts the axial movement of the plain bearings 1410 and 1420. Between an end face 1411 of the plain bearing 1410 facing the large-diameter part 1360 (end face on the right side in FIG. 18) and an end face 1361 of the large-diameter part 1360 facing the plain bearing 1410 (end face on the left side in FIG. 18, annular stepped surface) remains a very small gap. Between an end face 1421 of the plain bearing 1420 facing the large-diameter part 1360 (end face on the left side in FIG. 18) and an end face 1362 of the large-diameter part 1360 facing the plain bearing 1420 (end face on the right side in FIG. 18, annular stepped surface) remains a very small gap. Thus, the impeller 400 is mounted to the shaft 1300 such that it is allowed to move in the axial direction to some extent.

In this embodiment, lubrication grooves and dynamic pressure generating grooves are formed in the end faces 1361 and 1362 of the large-diameter part 1360. Any of the shapes shown in FIGS. 5 to 7, 9, and 15 or laterally inverted ones of these may be adopted for the shapes of the grooves formed in the end faces 1361 and 1362, as with the case with forming lubrication grooves and dynamic pressure generating grooves in the end face 321 in Embodiment 3 described above. Thus, in the pump 130, the sliding resistance of the plain bearings 1410 and 1420 against the large-diameter part 1360 is synergistically reduced by the grooves formed in the end faces 1361 and 1362 of the large-diameter part 1360. Therefore, even when the impeller 400 moves in the axial direction with the shaft 1300 during high speed rotation of the impeller 400, the sliding resistance of the plain bearings 1410 and 1420 against the large-diameter part 1360 can be reduced, so that an increase in rotation torque of the impeller 400 can be minimized.

Moreover, with the pump 130, there is no need to provide the restrictor 320 in Embodiment 3, so that an increase in rotation torque of the impeller 400 (rotation torque when the impeller moves to the left of the drawing) can be minimized without increasing the number of components.

As with Embodiment 4, each of the grooves formed in the end faces 1361 and 1362 may have various depths and shapes as long as they exhibit their functions. The lubrication grooves and dynamic pressure generating grooves may be formed in the end face 1411 of the plain bearing 1410 and in the end face 1421 of the plain bearing 1420 instead of in the end faces 1361 and 1362. In this case, the configuration of the lubrication grooves and dynamic pressure generating grooves is the same as explained in the embodiments above. Various similar changes made in the embodiments described above can be adopted as required.

While the configurations explained in the embodiments and variation examples described above have the lubrication grooves and dynamic pressure generating grooves formed in either one of two opposite end faces, a configuration having the lubrication grooves and dynamic pressure generating grooves formed in both of the two opposite end faces may also be adopted. Namely, various configurations described herein can be combined as required and applied, as long as they can exhibit their functions.

REFERENCE SIGNS LIST 100, 110, 120, 130: Pump
200: Housing
201: Cylindrical part
202: Inlet passage
203: Outlet passage 204: Side face
300, 301, 1300: Shaft
310, 320: Restrictor
311, 321: End face
312, 322, 332a, 332b, 342: Lubrication groove
313, 323, 333, 343: Dynamic pressure generating groove
350, 1350, 1351: Small-diameter part
360, 1360: Large-diameter part
361: End face
400: Impeller
401: Shaft hole
402: Body part
403: Flange part
410, 1410, 1420: Plain bearing
411, 421: End face
411a: Shaft hole
412, 422, 432a, 432b, 442: Lubrication groove
413, 423, 433, 443: Dynamic pressure generating groove
414, 424: Distal end
420: Inner magnet
500: Motor
510: Bracket
520: Outer magnet
521: Stator
522: Coil

The invention claimed is:

1. An annular plain bearing provided to a pump, the pump including a housing, a shaft provided in the housing, and an impeller rotating with respect to the housing to transfer a fluid by pressure in the housing, the plain bearing rotatably supporting the impeller with respect to the housing and being restricted from moving in an axial direction by an annular restrictor fixed to the housing, wherein
  on an end face of the plain bearing facing the restrictor, a lubrication groove communicating with a radially inner side and a radially outer side of the plain bearing to supply the fluid onto the end face for lubrication, and a dynamic pressure generating groove that introduces a fluid flow created by rotation of the impeller to generate a dynamic pressure, are provided,
  the lubrication groove is formed linearly in a radial direction, and
  the dynamic pressure generating groove is formed to extend circumferentially from the lubrication groove.

2. The plain bearing according to claim 1, wherein
  the shaft is fixed to the housing,
  the restrictor is fixed to the housing via the shaft,
  the impeller has a shaft hole for the shaft to pass through and rotates with respect to the shaft, and
  the plain bearing is fixed to the shaft hole of the impeller and rotatably supports the impeller with respect to the shaft so as to rotatably support the impeller with respect to the housing.

3. The plain bearing according to claim 1, wherein
  the shaft rotates with respect to the housing,
  the impeller is fixed to the shaft and rotates with the shaft with respect to the housing, and
  the plain bearing rotatably supports the shaft so as to rotatably support the impeller with respect to the housing.

4. The plain bearing according to claim 1, wherein
  the lubrication groove is formed deeper than the dynamic pressure generating groove.

5. The plain bearing according to claim 1, wherein the dynamic pressure generating groove is formed to become shallower toward its distal end in the circumferential direction.

6. The plain bearing according to claim 1, wherein the distal end in the circumferential direction of the dynamic pressure generating groove is formed to be dead end without communicating with the radially inner side and the radially outer side of the plain bearing.

7. A pump for transferring a fluid by pressure, comprising:
  a housing;
  a shaft provided in the housing;
  an impeller that rotates with respect to the housing to transfer a fluid by pressure inside the housing;
  an annular plain bearing that rotatably supports the impeller with respect to the housing; and
  an annular restrictor that is fixed to the housing and restricts movement of the plain bearing in an axial direction, wherein
  either on one of an end face of the plain bearing facing the restrictor and an end face of the restrictor facing the plain bearing, a lubrication groove communicating with a radially inner side and a radially outer side of the plain bearing to supply the fluid onto the end face for lubrication, and a dynamic pressure generating groove that introduces a fluid flow created by rotation of the impeller to generate a dynamic pressure, are provided,
  the lubrication groove is formed linearly in a radial direction, and
  the dynamic pressure generating groove is formed to extend circumferentially from the lubrication groove.

8. The pump according to claim 7, wherein
  the shaft is fixed to the housing,
  the restrictor is fixed to the housing via the shaft,
  the impeller has a shaft hole for the shaft to pass through and rotates with respect to the shaft, and
  the plain bearing is fixed to the shaft hole of the impeller and rotatably supports the impeller with respect to the shaft so as to rotatably support the impeller with respect to the housing.

9. The pump according to claim 7, wherein
  the shaft rotates with respect to the housing,
  the impeller is fixed to the shaft and rotates with the shaft with respect to the housing, and
  the plain bearing rotatably supports the shaft so as to rotatably support the impeller with respect to the housing.

10. The pump according to claim 7, wherein
  the lubrication groove is formed deeper than the dynamic pressure generating groove.

11. The pump according to claim 7, wherein the dynamic pressure generating groove is formed to become shallower toward its distal end in the circumferential direction.

12. The pump according to claim 7, wherein the distal end in the circumferential direction of the dynamic pressure generating groove is formed to be dead end without communicating with the radially inner side and the radially outer side of the plain bearing.

* * * * *